United States Patent
Yu et al.

(10) Patent No.: US 12,176,526 B2
(45) Date of Patent: Dec. 24, 2024

(54) COMPOSITIONALLY MODIFIED SILICON COATINGS FOR USE IN A LITHIUM ION BATTERY ANODE

(71) Applicant: Amprius Technologies, Inc., Fremont, CA (US)

(72) Inventors: Chentao Yu, Fremont, CA (US); Weijie Wang, Sunnyvale, CA (US); Constantin Ionel Stefan, San Jose, CA (US); Jonathan Bornstein, Cupertino, CA (US); Daniel Seo, Sunnyvale, CA (US)

(73) Assignee: AMPRIUS TECHNOLOGIES, INC., Fremont, CA (US)

( * ) Notice: Subject to any disclaimer, the term of this patent is extended or adjusted under 35 U.S.C. 154(b) by 295 days.

(21) Appl. No.: 16/797,553

(22) Filed: Feb. 21, 2020

(65) Prior Publication Data
US 2020/0274151 A1    Aug. 27, 2020

Related U.S. Application Data

(60) Provisional application No. 62/808,843, filed on Feb. 22, 2019.

(51) Int. Cl.
  *H01M 4/36* (2006.01)
  *H01M 4/04* (2006.01)
  (Continued)

(52) U.S. Cl.
  CPC ......... *H01M 4/366* (2013.01); *H01M 4/0428* (2013.01); *H01M 4/386* (2013.01);
  (Continued)

(58) Field of Classification Search
  None
  See application file for complete search history.

(56) References Cited

U.S. PATENT DOCUMENTS

| 4,366,215 A | 12/1982 | Coetzer et al. |
| 4,436,796 A | 3/1984 | Huggins et al. |

(Continued)

FOREIGN PATENT DOCUMENTS

| CN | 1891668 A | 1/2004 |
| CN | 1476645 A | 2/2004 |

(Continued)

OTHER PUBLICATIONS

U.S. Appl. No. 12/437,529, Office Action mailed May 13, 2011.
(Continued)

*Primary Examiner* — Zhongqing Wei
(74) *Attorney, Agent, or Firm* — Weaver Austin Villeneuve and Sampson LLP

(57) ABSTRACT

Provided herein are nanostructures for lithium ion battery electrodes and methods of fabrication. In some embodiments, a nanostructure template coated with a silicon-based coating is provided. The silicon coating may include a non-conformal, more porous silicon-rich $SiE_x$ layer and a conformal, denser $SiE_x$ layer on the non-conformal, more porous layer. In some embodiments, two different deposition processes are used: a PECVD layer to deposit the non-conformal, silicon-rich $SiE_x$ layer and a thermal CVD process to deposit the conformal layer. The silicon-rich $SiE_x$ material prevents silicon crystalline domain growth, limits macroscopic swelling, increases lithium diffusion rate and enhances significantly battery life during lithium ion battery cycle of charge and discharge.

18 Claims, 8 Drawing Sheets

(51) Int. Cl.
*H01M 4/38* (2006.01)
*H01M 4/58* (2010.01)
*H01M 10/0525* (2010.01)
*H01M 4/02* (2006.01)

(52) U.S. Cl.
CPC ......... *H01M 4/58* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 5,426,006 A | 6/1995 | Delnick et al. |
| 5,457,343 A | 10/1995 | Ajayan |
| 5,702,845 A | 12/1997 | Kawakami et al. |
| 5,855,860 A | 1/1999 | Nishimine |
| 5,997,832 A | 12/1999 | Lieber |
| 6,025,094 A | 2/2000 | Visco et al. |
| 6,083,644 A | 7/2000 | Watanabe et al. |
| 6,090,505 A | 7/2000 | Shimamura et al. |
| 6,238,821 B1 | 5/2001 | Mukherjee et al. |
| 6,334,939 B1 | 1/2002 | Zhou |
| 6,355,377 B1 | 3/2002 | Sheem et al. |
| 6,423,453 B1 | 7/2002 | Noda |
| 6,514,395 B2 | 2/2003 | Zhou |
| 6,521,540 B1 | 2/2003 | Li |
| 6,667,099 B1 | 12/2003 | Greiner et al. |
| 7,189,476 B1 | 3/2007 | Macklin et al. |
| 7,402,829 B2 | 7/2008 | Green |
| 7,408,829 B2 | 8/2008 | Kuang et al. |
| 7,438,759 B2 | 10/2008 | Zhang et al. |
| 7,682,750 B2 | 3/2010 | Chen |
| 7,704,480 B2 | 4/2010 | Jiang et al. |
| 7,794,840 B2 | 6/2010 | Grigorian et al. |
| 7,816,031 B2 | 10/2010 | Cui et al. |
| 7,816,709 B2 | 10/2010 | Balzano et al. |
| 7,951,489 B2 | 5/2011 | Kim et al. |
| 8,017,272 B2 | 9/2011 | Feng et al. |
| 8,202,568 B2 | 6/2012 | Lin et al. |
| 8,206,569 B2 | 6/2012 | Lopatin et al. |
| 8,241,372 B2 | 8/2012 | Cheng et al. |
| 8,252,245 B2 | 8/2012 | Tonkovich et al. |
| 8,257,866 B2 | 9/2012 | Loveness et al. |
| 8,263,258 B2 | 9/2012 | Nakazato et al. |
| 8,367,240 B2 | 2/2013 | Honda |
| 8,420,258 B2 | 4/2013 | Rojeski |
| 8,450,012 B2 | 5/2013 | Cui et al. |
| 8,481,214 B2 | 7/2013 | Rojeski |
| 8,491,718 B2 | 7/2013 | Chaudhari |
| 8,556,996 B2 | 10/2013 | Loveness et al. |
| 8,568,914 B2 | 10/2013 | Pol et al. |
| 8,652,683 B2 | 2/2014 | Rojeski |
| 8,658,310 B2 | 2/2014 | Rojeski |
| 8,709,654 B2 | 4/2014 | Takeuchi et al. |
| 8,828,481 B2 | 9/2014 | Burton et al. |
| 8,877,374 B2 | 11/2014 | Cui et al. |
| 8,900,748 B2 | 12/2014 | Cho |
| 9,172,088 B2 | 10/2015 | Loveness et al. |
| 9,172,094 B2 | 10/2015 | Loveness et al. |
| 9,209,456 B2 | 12/2015 | Fasching et al. |
| 9,231,243 B2 | 1/2016 | Cui et al. |
| 9,412,998 B2 | 8/2016 | Rojeski et al. |
| 9,431,181 B2 | 8/2016 | Rojeski |
| 9,698,410 B2 | 7/2017 | Fasching et al. |
| 9,780,365 B2 | 10/2017 | Liu et al. |
| 9,917,300 B2 | 3/2018 | Rojeski |
| 9,923,201 B2 | 3/2018 | Wang et al. |
| 9,979,017 B2 | 5/2018 | Rojeski |
| 10,090,512 B2 | 10/2018 | Cui et al. |
| 10,096,817 B2 | 10/2018 | Loveness et al. |
| 10,230,101 B2 | 3/2019 | Loveness et al. |
| 10,461,359 B2 | 10/2019 | Cui et al. |
| 10,707,484 B2 | 7/2020 | Wang et al. |
| 10,811,675 B2 | 10/2020 | Cui et al. |
| 11,024,841 B2 | 6/2021 | Loveness et al. |
| 11,289,701 B2 | 3/2022 | Wang et al. |
| 11,855,279 B2 | 12/2023 | Wang et al. |
| 11,996,550 B2 | 5/2024 | Loveness et al. |
| 2002/0028384 A1 | 3/2002 | Krasnov et al. |
| 2002/0102461 A1 | 8/2002 | Baker et al. |
| 2002/0137334 A1 | 9/2002 | Watanabe et al. |
| 2002/0148727 A1 | 10/2002 | Zhou et al. |
| 2003/0175589 A1 | 9/2003 | Kaminaka et al. |
| 2003/0178104 A1 | 9/2003 | Sekine |
| 2003/0203139 A1 | 10/2003 | Ren et al. |
| 2004/0023111 A1 | 2/2004 | Ohshita et al. |
| 2004/0126653 A1 | 7/2004 | Visco et al. |
| 2004/0126659 A1 | 7/2004 | Graetz |
| 2004/0197641 A1 | 10/2004 | Visco et al. |
| 2004/0258984 A1 | 12/2004 | Ariel et al. |
| 2005/0100793 A1 | 5/2005 | Jonghe et al. |
| 2005/0153208 A1 | 7/2005 | Konishiike et al. |
| 2005/0175901 A1 | 8/2005 | Kawakami et al. |
| 2005/0238810 A1 | 10/2005 | Scaringe et al. |
| 2005/0250004 A1 | 11/2005 | McLean et al. |
| 2005/0279274 A1 | 12/2005 | Nui et al. |
| 2006/0040182 A1 | 2/2006 | Kawakami et al. |
| 2006/0066201 A1 | 3/2006 | Ra et al. |
| 2006/0097691 A1 | 5/2006 | Green |
| 2006/0147797 A1 | 7/2006 | Wu et al. |
| 2006/0154141 A1 | 7/2006 | Salot et al. |
| 2006/0165988 A1 | 7/2006 | Chiang et al. |
| 2006/0204853 A1 | 9/2006 | Chen |
| 2006/0216603 A1 | 9/2006 | Choi |
| 2006/0258133 A1 | 11/2006 | Georgiev et al. |
| 2006/0261134 A1 | 11/2006 | Ho |
| 2007/0065720 A1 | 3/2007 | Hasegawa et al. |
| 2007/0095276 A1 | 5/2007 | Sunkara et al. |
| 2007/0117007 A1 | 5/2007 | Visco et al. |
| 2007/0148544 A1 | 7/2007 | Le |
| 2007/0154808 A1 | 7/2007 | Konishiike et al. |
| 2007/0190422 A1 | 8/2007 | Morris |
| 2007/0212538 A1 | 9/2007 | Niu |
| 2007/0281216 A1 | 12/2007 | Petrat et al. |
| 2007/0298168 A1 | 12/2007 | Ajayan et al. |
| 2008/0008844 A1 | 1/2008 | Bettge et al. |
| 2008/0038638 A1 | 2/2008 | Zhang et al. |
| 2008/0044732 A1 | 2/2008 | Salot et al. |
| 2008/0057399 A1 | 3/2008 | Visco et al. |
| 2008/0087314 A1 | 4/2008 | Xiao et al. |
| 2008/0110486 A1 | 5/2008 | Tsakalakos et al. |
| 2008/0145762 A1 | 6/2008 | Adachi et al. |
| 2008/0161746 A1 | 7/2008 | Visco et al. |
| 2008/0206641 A1 | 8/2008 | Christensen et al. |
| 2008/0213603 A1 | 9/2008 | Kobayashi et al. |
| 2008/0261116 A1 | 10/2008 | Burton et al. |
| 2008/0274403 A1 | 11/2008 | Kim et al. |
| 2008/0280169 A1 | 11/2008 | Niu et al. |
| 2008/0280207 A1 | 11/2008 | Patoux et al. |
| 2009/0004566 A1 | 1/2009 | Shirane et al. |
| 2009/0029256 A1 | 1/2009 | Mah |
| 2009/0042102 A1 | 2/2009 | Cui et al. |
| 2009/0061319 A1 | 3/2009 | Kim et al. |
| 2009/0068553 A1 | 3/2009 | Firsich |
| 2009/0117472 A1 | 5/2009 | Iwamoto |
| 2009/0162746 A1 | 6/2009 | Honda |
| 2009/0162750 A1 | 6/2009 | Kawakami et al. |
| 2009/0169996 A1 | 7/2009 | Zhamu |
| 2009/0176159 A1 | 7/2009 | Zhamu et al. |
| 2009/0186267 A1 | 7/2009 | Tiegs |
| 2009/0188544 A1 | 7/2009 | Kobayashi et al. |
| 2009/0202908 A1 | 8/2009 | Sumihara et al. |
| 2009/0202915 A1 | 8/2009 | Modeki et al. |
| 2009/0214942 A1 | 8/2009 | Frank et al. |
| 2009/0214944 A1 | 8/2009 | Rojeski |
| 2009/0246628 A1 | 10/2009 | Adachi et al. |
| 2009/0269511 A1 | 10/2009 | Zhamu et al. |
| 2009/0291371 A1 | 11/2009 | Konishiike et al. |
| 2009/0305131 A1 | 12/2009 | Kumar et al. |
| 2009/0305135 A1 | 12/2009 | Shi et al. |
| 2009/0311605 A1 | 12/2009 | Visco et al. |
| 2009/0316335 A1 | 12/2009 | Simon et al. |
| 2010/0043877 A1 | 2/2010 | Wang et al. |
| 2010/0119948 A1 | 5/2010 | Hasegawa et al. |

(56) References Cited

U.S. PATENT DOCUMENTS

| | | | |
|---|---|---|---|
| 2010/0122725 A1 | 5/2010 | Buchine et al. |
| 2010/0159337 A1 | 6/2010 | Matsumoto et al. |
| 2010/0176337 A1 | 7/2010 | Zhamu et al. |
| 2010/0209775 A1 | 8/2010 | Kim et al. |
| 2010/0237272 A1 | 9/2010 | Chaudhari |
| 2010/0266897 A1 | 10/2010 | Lee et al. |
| 2010/0285358 A1 | 11/2010 | Cui et al. |
| 2010/0291441 A1 | 11/2010 | Ugaji et al. |
| 2010/0297502 A1 | 11/2010 | Zhu et al. |
| 2010/0310941 A1 | 12/2010 | Kumta et al. |
| 2010/0330421 A1 | 12/2010 | Cui et al. |
| 2010/0330423 A1 | 12/2010 | Cui et al. |
| 2011/0008233 A1 | 1/2011 | Miyanaga |
| 2011/0024169 A1 | 2/2011 | Buchine et al. |
| 2011/0027655 A1 | 2/2011 | Rojeski |
| 2011/0111294 A1 | 5/2011 | Lopez et al. |
| 2011/0111300 A1 | 5/2011 | DelHagen et al. |
| 2011/0111304 A1 | 5/2011 | Cui et al. |
| 2011/0135925 A1 | 6/2011 | Zhamu et al. |
| 2011/0143019 A1 | 6/2011 | Mosso et al. |
| 2011/0143263 A1 | 6/2011 | Shirvanian et al. |
| 2011/0151290 A1 | 6/2011 | Cui et al. |
| 2011/0159365 A1 | 6/2011 | Loveness et al. |
| 2011/0159367 A1 | 6/2011 | Kim et al. |
| 2011/0189510 A1 | 8/2011 | Caracciolo et al. |
| 2011/0205688 A1 | 8/2011 | Ray et al. |
| 2011/0229761 A1 | 9/2011 | Cui et al. |
| 2011/0269025 A1 | 11/2011 | Sun et al. |
| 2011/0287318 A1 | 11/2011 | Loveness et al. |
| 2012/0028123 A1 | 2/2012 | Asari et al. |
| 2012/0034524 A1 | 2/2012 | Caracciolo et al. |
| 2012/0070741 A1 | 3/2012 | Liu et al. |
| 2012/0094192 A1 | 4/2012 | Jun et al. |
| 2012/0183856 A1 | 7/2012 | Cui et al. |
| 2012/0292586 A1 | 11/2012 | Yamauchi et al. |
| 2012/0301785 A1 | 11/2012 | Buchine et al. |
| 2012/0301789 A1 | 11/2012 | Loveness et al. |
| 2012/0328942 A1 | 12/2012 | Thomas-Alyea et al. |
| 2013/0004657 A1 | 1/2013 | Xu et al. |
| 2013/0011736 A1 | 1/2013 | Loveness et al. |
| 2013/0069601 A1 | 3/2013 | Coowar et al. |
| 2013/0078523 A1 | 3/2013 | Rojeski |
| 2013/0143124 A1 | 6/2013 | Lee et al. |
| 2013/0247966 A1 | 9/2013 | Buchine et al. |
| 2013/0320582 A1 | 12/2013 | Cui et al. |
| 2013/0344383 A1 | 12/2013 | Loveness et al. |
| 2014/0038028 A1 | 2/2014 | Genard |
| 2014/0096819 A1 | 4/2014 | Kirkengen et al. |
| 2015/0140333 A1* | 5/2015 | Niu .................. B01J 35/0013 |
| | | 252/502 |
| 2015/0325852 A1* | 11/2015 | Wang .................. H01M 4/386 |
| | | 429/231.95 |
| 2016/0013483 A1 | 1/2016 | Loveness et al. |
| 2016/0190600 A1 | 6/2016 | Cui et al. |
| 2017/0098819 A9 | 4/2017 | Loveness et al. |
| 2017/0187070 A1* | 6/2017 | Park .................. H01M 4/485 |
| 2017/0338464 A1 | 11/2017 | Fasching et al. |
| 2018/0090755 A1 | 3/2018 | Liu et al. |
| 2019/0273252 A1 | 1/2019 | Loveness et al. |
| 2019/0058186 A1 | 2/2019 | Cui et al. |
| 2019/0088939 A1 | 3/2019 | Wang et al. |
| 2020/0274156 A1 | 8/2020 | Wang et al. |
| 2021/0104730 A1 | 4/2021 | Cui et al. |
| 2022/0020979 A1 | 1/2022 | Loveness et al. |
| 2022/0115650 A1 | 4/2022 | Wang et al. |
| 2022/0149379 A1 | 5/2022 | Liu et al. |

FOREIGN PATENT DOCUMENTS

| | | |
|---|---|---|
| CN | 1705148 | 12/2005 |
| CN | 1705418 A | 12/2005 |
| CN | 1979828 A | 6/2007 |
| CN | 101346834 | 1/2009 |
| CN | 101346836 A | 1/2009 |
| CN | 101356666 A | 1/2009 |
| CN | 101356670 A | 1/2009 |
| CN | 101453013 | 6/2009 |
| CN | 101527357 | 9/2009 |
| CN | 101560694 | 10/2009 |
| CN | 101689628 A | 3/2010 |
| CN | 101453016 | 6/2010 |
| CN | 101356666 B | 10/2010 |
| CN | 101953014 | 1/2011 |
| CN | 101986447 | 3/2011 |
| CN | 101989655 | 3/2011 |
| CN | 102460782 | 5/2012 |
| CN | 101689628 B | 6/2012 |
| CN | 102844917 A | 12/2012 |
| CN | 102959775 A | 3/2013 |
| CN | 106663786 A | 5/2017 |
| CN | 107851777 A | 3/2018 |
| EP | 883199 | 12/1998 |
| EP | 1 205 989 | 5/2002 |
| EP | 845828 | 10/2002 |
| EP | 1494302 | 1/2005 |
| EP | 1 873 846 | 1/2008 |
| EP | 2 219 250 | 8/2010 |
| EP | 2 427 928 | 3/2012 |
| EP | 2549567 A1 | 1/2013 |
| FR | 2880198 | 6/2006 |
| GB | 2470056 | 11/2010 |
| JP | 2000-036323 | 2/2000 |
| JP | 2002-216751 | 8/2002 |
| JP | 2003-303588 | 10/2003 |
| JP | 2005-259697 | 9/2005 |
| JP | 2005-310759 | 11/2005 |
| JP | 2006-269306 | 10/2006 |
| JP | 2007-061945 | 3/2007 |
| JP | 2007-123100 | 5/2007 |
| JP | 2008-026595 | 2/2008 |
| JP | 2008-192594 | 8/2008 |
| JP | 2008-235258 | 10/2008 |
| JP | 2008-269827 | 11/2008 |
| JP | 2008-305781 | 12/2008 |
| JP | 2009-021226 | 1/2009 |
| JP | 2009-032693 | 2/2009 |
| JP | 2009-117165 | 5/2009 |
| JP | 2009-164137 | 7/2009 |
| JP | 2010-525549 | 7/2010 |
| JP | 2010-262752 | 11/2010 |
| JP | 2010-538444 | 12/2010 |
| JP | 2011-108639 | 6/2011 |
| JP | 2012-526364 | 10/2012 |
| JP | 2012-527735 | 11/2012 |
| JP | 2012-556203 | 6/2013 |
| JP | 2013-521621 A | 6/2013 |
| JP | 2015020921 A * | 2/2015 |
| JP | 2005-071655 | 3/2016 |
| JP | 2017521812 A | 8/2017 |
| JP | 6250538 | 12/2017 |
| KR | 2006-0047424 | 5/2006 |
| KR | 2007-0043950 | 4/2007 |
| KR | 2008-0070769 | 7/2008 |
| KR | 2009-0019339 | 2/2009 |
| KR | 2010-0113433 | 10/2010 |
| KR | 20130010733 A | 1/2013 |
| TW | 201611392 A | 3/2016 |
| WO | WO 2006/123049 | 11/2006 |
| WO | WO 2007/061945 A2 | 5/2007 |
| WO | WO 2007/071778 | 6/2007 |
| WO | WO 2007/083152 | 7/2007 |
| WO | WO 2008/044449 | 4/2008 |
| WO | WO 2007/083155 | 7/2008 |
| WO | WO 2008/139157 | 11/2008 |
| WO | WO 2009/008558 | 1/2009 |
| WO | WO 2009/009206 | 1/2009 |
| WO | WO 2009/010757 | 1/2009 |
| WO | WO 2009/010758 | 1/2009 |
| WO | WO 2009/010759 | 1/2009 |
| WO | WO 2009/031715 | 3/2009 |
| WO | WO 2009/033015 | 3/2009 |
| WO | WO-2009038897 A2 | 3/2009 |
| WO | WO 2009/129490 | 10/2009 |

(56) References Cited

FOREIGN PATENT DOCUMENTS

| WO | WO 2010/100599 | 9/2010 |
|---|---|---|
| WO | WO 2010/129910 | 11/2010 |
| WO | WO 2010/138617 | 12/2010 |
| WO | WO 2010/138619 | 12/2010 |
| WO | WO 2011/015174 | 2/2011 |
| WO | WO 2011/053553 | 5/2011 |
| WO | WO 2011/053736 | 5/2011 |
| WO | WO 2011/056847 | 5/2011 |
| WO | WO 2011/066818 | 6/2011 |
| WO | WO 2011/094642 | 8/2011 |
| WO | WO 2011/109477 | 9/2011 |
| WO | WO 2011/137446 | 11/2011 |
| WO | WO 2011/149958 | 12/2011 |
| WO | WO 2012/027360 | 3/2012 |
| WO | WO 2012/054767 | 4/2012 |
| WO | WO 2013/096931 | 6/2013 |
| WO | WO 2014/008433 | 1/2014 |
| WO | WO 2015/175509 | 11/2015 |

OTHER PUBLICATIONS

U.S. Appl. No. 12/437,529, Final Office Action mailed Oct. 20, 2011.
U.S. Appl. No. 12/437,529, Office Action mailed Dec. 22, 2011.
U.S. Appl. No. 13/427,681, Office Action mailed Oct. 25, 2012.
U.S. Appl. No. 13/427,681, Office Action mailed Jun. 11, 2013.
U.S. Appl. No. 13/427,681, Office Action mailed Oct. 2, 2013.
U.S. Appl. No. 13/427,681, Office Action mailed May 21, 2014.
U.S. Appl. No. 13/427,681, Final Office Action mailed Feb. 6, 2015.
Examiner's Answer, dated Sep. 28, 2016, issued in U.S. Appl. No. 13/427,681.
Board of Appeal Decision, dated Nov. 15, 2017, issued in U.S. Appl. No. 13/427,681.
Notice of Allowance dated May 22, 2018, issued in U.S. Appl. No. 13/427,681.
Office Action dated Aug. 26, 2019 issued in U.S. Appl. No. 16/109,609.
CN patent application No. 201080026302.6, Office Action mailed Oct. 23, 2013.
CN patent application No. 201080026302.6, Office Action mailed Aug. 8, 2014.
CN patent application No. 201080026302.6, Office Action mailed Mar. 23, 2015.
CN patent application No. 201080026302.6, Chinese Office Action mailed Nov. 10, 2015.
EP patent application No. 10772907.1, Supplemental European Search Report mailed Jul. 4, 2013.
JP patent application No. 2012-510025, Notice of Reasons for Rejection mailed Jan. 7, 2014.
Israel Office Action dated May 4, 2015, IL patent application No. 216100.
IL Office Action (Notification of Deficiencies Prior to Allowance of Patent Application) dated Jun. 22, 2016 issued in patent application No. 216100.
JP Application No. 2012-510025, Decision of Rejection Mailed Aug. 5, 2014.
WO patent application No. PCT/US2010/034106, International Search Report and Written Opinion mailed Feb. 7, 2011.
U.S. Appl. No. 12/787,168, Office Action mailed Jan. 10, 2013.
U.S. Appl. No. 12/787,168, Office Action mailed Sep. 10, 2013.
U.S. Appl. No. 12/787,168, Office Action mailed Feb. 26, 2014.
U.S. Appl. No. 12/787,168, Final Office Action mailed Nov. 6, 2014.
U.S. Appl. No. 12/787,168, Non-Final Office Action mailed Jul. 7, 2015.
U.S. Appl. No. 12/787,168, Final Office Action mailed Apr. 11, 2016.
U.S. Appl. No. 12/787,168, Office Action dated Mar. 9, 2017.
U.S. Appl. No. 12/787,168, Final Office Action dated Dec. 20, 2017.
CN patent application No. 201080023345.9, Office Action mailed Dec. 27, 2013.
CN patent application No. 201080023345.9, Office Action mailed Sep. 11, 2014.
CN patent application No. 201080023345.9, Office Action mailed Apr. 16, 2015.
EP patent application No. 10781151.5, Supplemental European Search Report mailed Jun. 28, 2013.
Israel Office Action dated Oct. 13, 2015, IL patent application No. 216248.
JP patent application No. 2012-513225, Notification of Reasons for Rejection mailed Dec. 17, 2013.
JP patent application No. 2012-513225, Decision for Grant and Allowed Claims received Jul. 17, 2014.
Korean Notification of Provisional Rejection dated Aug. 19, 2015, KR patent application No. 10-2011-7031120.
Korean Notice of First Refusal Ruling issued Apr. 28, 2016, KR patent application No. 10-2011-7031120.
WO patent application No. PCT/US2010/036235, International Search Report and Written Opinion mailed Jan. 28, 2011.
Office Action mailed Apr. 5, 2012 for U.S. Appl. No. 13/039,031.
Notice of allowance mailed Jul. 26, 2012 for U.S. Appl. No. 13/039,031.
US Office Action mailed Sep. 17, 2012 issued in U.S. Appl. No. 13/564,324.
U.S. Appl. No. 13/914,491, Notice of Allowance mailed Feb. 22, 2013.
Pre-Issuance Submission by Third Party dated Jan. 15, 2014, received in U.S. Appl. No. 13/914,491.
U.S. Appl. No. 14/859,125, Notice of Allowance mailed Jun. 19, 2015.
Office Action dated Jan. 2, 2018 for U.S. Appl. No. 14/859,125.
Final Office Action dated Jul. 16, 2018 for U.S. Appl. No. 14/859,125.
Notice of Allowance dated Oct. 24, 2018 for U.S. Appl. No. 14/859,125.
CN patent application No. 201180019460.3, Office Action mailed Jul. 2, 2014.
CN patent application No. 201180019460.3, Office Action mailed May 6, 2015.
CN patent application No. 201510674597.2, Office Action and Search Report mailed Mar. 28, 2017.
EP patent application No. 11751259.0, Office Action mailed Dec. 12, 2016.
EP patent application No. 11751259.0, Extended Search Report mailed Mar. 16, 2017.
EP Office Action issued in Application No. 11751259.0 dated May 23, 2018.
JP patent application No. 2012-556203, Office Action mailed Aug. 26, 2014.
JP patent application No. 2012-556203, Office Action mailed Jul. 14, 2015.
JP patent application No. 2016-077671, Office Action dated Jul. 4, 2017.
JP patent application No. 2016-077671, Office Action mailed May 29, 2018.
KR patent application No. 10-2012-7024928, Office Action dated Aug. 28, 2017.
KR Office Action dated Jan. 21, 2019 for application No. 10-2018-7028397.
TW patent application No. 100120247, published Sep. 16, 2012, English Abstract.
TW patent application No. 100120247, Office Action mailed Feb. 9, 2015.
WO patent application No. PCT/US2011/026816, International Search Report and Written Opinion mailed Oct. 18, 2011.
Office Action mailed Apr. 26, 2012, issued in U.S. Appl. No. 12/787,138.
Final Office Action mailed Oct. 11, 2012, issued in U.S. Appl. No. 12/787,138.
Notice of Allowance mailed Jan. 28, 2013, issued in U.S. Appl. No. 12/787,138.
Office Action mailed Jun. 19, 2014, issued in U.S. Appl. No. 13/891,035.
Final Office Action mailed Apr. 23, 2015, issued in U.S. Appl. No. 13/891,035.

(56) References Cited

OTHER PUBLICATIONS

Notice of Allowance mailed Aug. 26, 2015, issued in U.S. Appl. No. 13/891,035.
Supplemental Notice of Allowance mailed Sep. 23, 2015, issued in U.S. Appl. No. 13/891,035.
Office Action issued in issued in U.S. Appl. No. 14/952,744, dated Sep. 27, 2016.
Final Office Action mailed Aug. 25, 2017, issued in U.S. Appl. No. 14/952,744.
Office Action issued in U.S. Appl. No. 14/952,744, filed Mar. 21, 2018.
Office Action mailed Nov. 21, 2018, issued in U.S. Appl. No. 14/952,744.
Notice of Allowance dated Jun. 14, 2019 issued in U.S. Appl. No. 14/952,744.
CN patent application No. 201080023257.9, Chinese Office Action mailed Dec. 12, 2013.
CN patent application No. 201080023257.9, Chinese Office Action mailed Oct. 21, 2014.
CN patent application No. 201080023257.9, Chinese Office Action mailed Jun. 4, 2015.
EP patent application No. 10781153.1, Supplemental European Search Report mailed Jul. 4, 2013.
EP patent application No. 10781153.1, Supplemental Search Report and Written Opinion mailed Jan. 30, 2018.
Israel Office Action dated Aug. 10, 2015, IL patent application No. 216246.
IL patent application No. 216246, Office Action mailed Jan. 20, 2016.
IL patent application No. 216246, Office Action dated Jun. 29, 2017.
JP patent application No. 2012-513226, Japanese Office Action mailed Feb. 4, 2014.
JP patent application No. 2012-513226, Japanese Office Action mailed Feb. 10, 2015.
Japanese Office Action dated Aug. 25, 2015, issued in Application No. 2012-513226.
International Search Report and Written Opinion mailed Feb. 1, 2011, issued in PCT Application No. PCT/WO2010/036237.
U.S. Appl. No. 13/114,413, Office Action mailed Jun. 19, 2014.
U.S. Appl. No. 13/114,413, Notice to Allowance mailed Jan. 22, 2015.
U.S. Appl. No. 13/114,413, Notice of Allowance mailed Jun. 24, 2015.
WO patent application No. PCT/US2011/037767, International Search Report and Written Opinion mailed Jan. 16, 2012.
U.S. Appl. No. 13/277,821, Office Action mailed Feb. 25, 2013.
U.S. Appl. No. 13/277,821, Office Action mailed Oct. 11, 2013.
U.S. Appl. No. 13/277,821, Office Action mailed Apr. 10, 2014.
U.S. Appl. No. 13/277,821, Final Office Action mailed Nov. 20, 2014.
U.S. Appl. No. 13/277,821, Decision on Appeal dated Oct. 18, 2016.
U.S. Appl. No. 13/277,821, Notice of Allowance dated Jan. 4, 2017.
U.S. Appl. No. 13/277,821, Notice of Allowance mailed Jun. 1, 2017.
US Office Action dated Apr. 16, 2019, issued in U.S. Appl. No. 15/694,470.
US Final Office Action dated Dec. 31, 2019, issued in U.S. Appl. No. 15/694,470.
TW Office Action issue in Application No. 100138369, dated Dec. 22, 2015.
TW Office Action issue in Application No. 105142724, dated Nov. 13, 2017.
WO patent application No. PCT/US2011/057159, International Search Report and Written Opinion mailed Jun. 11, 2012.
Office Action issued on Dec. 7, 2012 in U.S. Appl. No. 13/277,620.
Office Action issued on Aug. 29, 2013 in U.S. Appl. No. 13/277,620.
Final Office Action issued on Mar. 28, 2014 in U.S. Appl. No. 13/277,620.
Office Action issued on Nov. 4, 2014 in U.S. Appl. No. 13/277,620.

Notice of Allowance issued on Jul. 31, 2015 in U.S. Appl. No. 13/277,620.
Office Action issued on Dec. 31, 2015 in U.S. Appl. No. 14/928,576.
Office Action issued on Jun. 21, 2016 in U.S. Appl. No. 15/608,829.
Notice of Allowance issued on Oct. 6, 2016 in U.S. Appl. No. 15/608,829.
US Office Action dated May 16, 2018, issued in U.S. Appl. No. 15/608,829.
US Final Office Action dated Dec. 21, 2018 issued in U.S. Appl. No. 15/608,829.
Chinese Office Action dated Mar. 30, 2015, issued in Application No. 201180057806.9.
Second Chinese Office Action dated Nov. 19, 2015, issued in Application No. 201180057806.9.
EP Extended Search Report dated Nov. 19, 2015, issued in Application No. 11835170.9.
JP Notice of Reasons for Rejection issued on Sep. 8, 2015, in Application No. 2013-535103.
JP Notice of Reasons for Rejection issued on Sep. 6, 2016, in Application No. 2013-535103.
JP Office Action dated Oct. 2, 2018, issued in Application No. 2017-147013.
KR Notice of Reasons for Rejection issued on Feb. 27, 2017 in Application No. 10-2013-7012809.
KR Notice of Reasons for Rejection issued on Oct. 21, 2017 in Application No. 10-2013-7012809.
KR Notification of Provisional Rejection issued on Apr. 17, 2019 in Application No. 10-2018-7013041.
TW Office Action issued on Nov. 13, 2015, in Application No. 100138361.
International Search Report and Written Opinion mailed Jun. 28, 2012, issued in Application No. PCT/US2011/057158.
Pre-Issuance Submission by Third Party dated Jan. 21, 2014, received in U.S. Appl. No. 13/914,491.
U.S. Appl. No. 13/914,491, Office Action mailed Jan. 8, 2016.
U.S. Appl. No. 13/540,484, Notice of Allowance dated Feb. 12, 2018.
CN Office Action issued in Application No. 201280038037.2 on Aug. 5, 2015.
CN Office Action issued in application No. 201280038037.2, dated May 26, 2016.
CN Office Action issued in Application No. 201280038037.2 on Feb. 6, 2017.
EP Search Report issued in Application No. 12807729.4 on Feb. 5, 2015.
EP Search Report issued in Application No. 12807729.4 on Jun. 2, 2015.
EP Search Report issued in Application No. 12807729.4 on Jan. 11, 2017.
JP Office Action issued in application No. 2014-519238, dated May 31, 2016.
JP Office Action issued in Application No. 2014-519238 on Feb. 7, 2017.
KR patent application No. 10-2014-7002762, Office Action dated Jul. 27, 2018.
KR Search Report issued in Application No. 10-2014-7002762 on May 9, 2019.
Notice of final Rejection issued in Application No. 10-2014-7002762 on Sep. 17, 2019.
WO patent application No. PCT/US2012/045313, International Search Report and Written Opinion mailed Jan. 21, 2013.
U.S. Appl. No. 14/710,103, Office Action dated May 22, 2017.
Notice of Allowance issued in U.S. Appl. No. 14/710,103, dated Oct. 27, 2017.
US Office Action issued on Oct. 22, 2019 in U.S. Appl. No. 15/887,809.
US Notice of Allowance issued on Feb. 10, 2020 in U.S. Appl. No. 15/887,809.
CN Office Action issued in Application No. 201580032057.2 on Aug. 31, 2018.
CN Office Action issued in Application No. 201580032057.2 on Mar. 30, 2019.

(56) References Cited

OTHER PUBLICATIONS

CN Office Action issued in Application No. 201580032057.2 on Sep. 20, 2019.
European Extended Search Report dated Dec. 22, 2017, issued in Application No. 15791953.1.
JP Office Action issued in Application No. 2016-567613 on May 28, 2019.
TW Office Action issued in Application No.104115079 on Nov. 19, 2018.
International Search report and Written Opinion dated Aug. 10, 2015, issued in Application No. PCT/US15/30336.
U.S. Appl. No. 11/837,291, Office Action mailed Feb. 18, 2009.
U.S. Appl. No. 11/837,291, Office Action mailed Oct. 26, 2009.
U.S. Appl. No. 11/837,291, Office Action mailed Jan. 7, 2010.
U.S. Appl. No. 11/837,291, Office Action mailed Apr. 22, 2010.
U.S. Appl. No. 11/837,291, Notice of Allowance mailed Aug. 10, 2010.
U.S. Appl. No. 12/895,424, Office Action mailed Nov. 17, 2010.
EP patent application No. 08831531.2, European Search Report mailed Oct. 27, 2010.
Aifantis et al., "High energy density lithium batteries", 2010 WILEY-VCH Verlag GmbH & Co. KGaA, Weinheim (Chapter 6: Next-generation anodes for secondary LiIon batteries) ISBN: 978-3-527-32407-1.
Baldwin, Richard K., et al. "Solution reduction synthesis of surface stabilized silicon nanoparticles," The Royal Society of Chemistry 2002, Chem. Commun., 2002, 1822-1823.
Bierman, et al., "Potential applications of hierarchical branching nanowires in solar energy conversion," Energy & Environmental Science, vol. 2, No. 10, Jan. 1, 2009 (Jan. 1, 2009), pp. 1050-1059.
Campbell et al., "Preparation of mesoporous silica templated metal nanowire films on foamed nickel substrates", Microporous and Mesoporous Materials 97 (2006) 114-121.
Carbon nanofiber product sheet, Applied Science 2008, downloaded from http://www.apsci.com/ngm-pyrol.html on May 2011.
Chan, C.K., et al., "High Capacity Li Ion Battery Anodes Using Ge Nanowires", Nano Letters, 2008, vol. 8, No. 1, 307-309.
Chan, et al., "High-Performance Lithium Battery Anodes Using Silicon Nanowires," Nature Nanotechnology, vol. 3, Jan. 2008, 5 pages.
Chan, Candace K. et al., "Structural and electrochemical study of the reaction of lithium with silicon nanowires," Journal of Power Sources 189 (2009) 34-39.
Chan, Candace K. et al., "Surface chemistry and morphology of the solid electrolyte interphase on silicon nanowire lithium-ion battery anodes," Journal of Power Sources 189 (2009) 1132-1140.
Chaudhari, P. et al. "Heteroepitaxial silicon film growth at 600 degree C for an Al—Si eutectic melt," Thin Solid Films 518 (2010) 5368-5371.
Che, G., et al., "Carbon Nanotubule Membranes for Electrochemical Energy Storage and Production". Nature 393, 346-349 (1998).
Cheng Mu et al., "Silicon nanotube array/gold electrode for direct electrochemistry of cytochrome e," J. Phys. Chem. B 2007, 111, 1491-1495, Nov. 21, 2006.
Cui, Li-Feng et al., "Carbon-silicon core-shell nanowires as high capacity electrode for lithium ion batteries," Nano Letters, published on Aug. 5, 2009 on http://pubs.acs.org.
Cui, Li-Feng et al., "Crystalline-amorphous core-shell silicon nanowires for high capacity and high current battery electrodes," Nano Letters, 2009, vol. 9, No. 1 491-495, Dec. 23, 2008.
Cui, Yi et al., "Doping and electrical transport in silicon nanowires", The Journal of Physical Chemistry, vol. 104, No. 22, Jun. 8, 2000.
Dick, et al A New Understanding of Au-Assisted Growth of III-V Semiconductor Nanowires, Adv. Funct. Mater. 15, 1603-1610 (2005).
Doerk et al., "Growth of branching Si nanowires seeded by Au—Si surface migration," Journal of Materials Chemistry, vol. 18, No. 44, Jan. 1, 2008 (Jan. 1, 2008), pp. 5376-5381.
Emmenegger, et al., "Carbon Nanotubes Synthesized on Metallic Substrates," Applied Surface Science, Aug. 1, 2000, pp. 452-456.
Esmanski, Alexei et al., "Silicon inverse-opal-based macroporous materials as negative electrodes for lithium ion batteries," Advanced Functional Materials, 2009, 1999-2010, May 7, 2009.
For high-performance anode material in lithium-ion batteries, After Gutenberg, downloaded from http://jcwinnie.biz/wordpress/?p=2864 on Dec. 25, 2009.
Frackowiak, E., et al., "Electrochemical Storage of Lithium Multiwalled Carbon Nanotubes," *Carbon* 37, 1999, pp. 61-69.
Gao, et al., "Alloy formation in nanostructured silicon." Adv. Mater. 13, 816-819 (2001).
Givargizov, "Fundamental aspects of VLS growth," Journal of Crystal Growth 31, 20-30 (1975).
Goldstein et al., "Melting in semiconductor nanocrystals," Science 256, 1425-1427 (Jun. 1992).
Green, M., et al Structured silicon anodes for lithium battery applications. Electrochem. Solid State Lett. 6, A75-A79 (2003).
Hertzberg et al., "Abstract SiC nanotubes Cu foil," J. Am. Chem. Soc., 2010, 8548-8549.
Hertzberg et al., "Deformations in Si—Li anodes upon electrochemical alloying in nano-confined space," J. Am. Chem. Soc. 2010, 132, 8548-8549, Apr. 15, 2010.
Hu L., et al. "Si nanoparticle-decorated Si nanowire networks for Li-ion battery anodes," The Royal Society of Chemistry, Chem. Commun., 2011, 47, pp. 367-369.
Huang et al., Catalytic Growth of Zinc Oxide Nanowires by Vapor Transport, Adv. Mater., 13, 113-116 (2001).
Huang et al., Fabrication of Silicon Nanowire Arrays with Controlled Diameter, Length, and Density, Adv. Mater., (2007), 19, 744-748.
Huggins, R.A. & Nix, W.D. Decrepitation Model for Capacity Loss During Cycling of Alloys in Rechargeable Electrochemical Systems, Ionics 6, 57-63 (2000).
Jie Xiao, et al., "Stabilization of silicon anode for Li-ion batteries," Journal of the Electrochemical Society, 157 (10) A1047-A1051, Aug. 2, 2010.
Kang, Kibum et al., "The role of NiOx overlayers on spontaneous growth of NiSix nanowires from Ni seed layers," Nano Letters 2008, vol. 8, No. 2 431-436, Jan. 12, 2008.
Kang, Kibum et al., Unconventional roles of metal catalysts in chemical-vapor syntheses of singel-crystalline nanowires,: Journal of Applied Physics 105, 122407 (2009).
Kasavajjula et al., "Nano- and bulk-silicon-based insertion anodes for lithium-ion secondary cells", Journal of Power Sources 163 (2007) 1003-1039.
Kim Hyesun, et al., "Superior Lithium Electroaactive Mesoporous Si@Carbon Core-Shell Nanowires for Lithium Battery Anode Material," American Chemical Society, Nano Letters, 2008, vol. 8, No. 11, pp. 3688-3691.
Kim, Cheol-Joo et al., "Spontaneous chemical vapor growth of NiSi nanowires and their metallic properties," Advanced Materials, 2007, 19, 3637-3642, Oct. 16, 2007.
Kim, et al., "Three-Dimensional Porous Silicon Particles for Use in High Performance Lithium Secondary Batteries," Angew, Chem, Int. Ed, vol. 47, Nov. 17, 2008, pp. 10151-10154.
Lee et al., "Anomalous growth and characterization of carbon-coated nickel silicide nanowires," Chemical Physics Letters 384, 2004, pp. 215-218.
Lee, Y.M., et al. SEI layer formation on amorphous Si thin electrode during precycling. J. Electrochem. Soc. 154, A515-A519 (2007).
Levitt, "Whisker Technology." Wiley Interscience, 1970.
Li et al., "A high capacity nano-Si composite anode material for lithium rechargeable batteries," Electrochemical and Solid-State Letters, 2 (11) 547-549 (1999).
Li et al., "Freestanding mesoporous quasi-single-crystalline Co3O4 nanowire arrays," J. Am. Chem. Soc. 2006, 128, 14258-14259, Oct. 18, 2006.
Li et al., "Rate capabilities of nanostructured LiMn2O4 electrodes in aqueous electrolyte." J. Electrochem. Soc. 147, 2044-2049 (2000).
Magasinki, A. et al., "High-performance lithium-ion anodes using a hierarchical bottom-up approach," Nature Materials, published online at www.nature.com/naturematerials Mar. 14, 2010.

(56) References Cited

OTHER PUBLICATIONS

Magasinski et al., "Hierarchical bottom-up approach for high-performance Si-based Li-ion battery anodes," Abstract #16, IMLB 2010, The Electrochemical Society.
Magasinski et al., "Towards efficent binders for Li-ion battery Si-based anodes," Abstract #64, IMLB 2010, The Electrochemical Society.
Marczak et al., "The individual core/shell silicon nanowire structure probed by Raman spetroscopy," Raman Spetroscopy, Phys. Status Solidi C 6 No. 9, 2053-2055, 2009.
Morales, et al., A Laser Ablation Method for the Synthesis of Crystalline Semiconductor Nanowires, SCIENCE vol. 279, Jan. 9, 1998.
Nickel Silicide Nanobelts and Sheets in Li-ion Anodes Capacity, Green Car Congress, Apr. 19, 2009, pp. 1-3.
Nishi, Yoshio, "Lithium ion secondary batteries; past 10 years and the future," *Journal of Power Sources*, vol. 100, 2001, pp. 101-106.
Pan et al., Nanobelts of Semiconduction Oxides, *Science* Mar. 9, 2001: 1947-1949.
Park, M.S. et al., "Preparation and Electrochemical Properties of SnO2 Nanowires for Application in Lithium-ion Batteries" Angew. Chem. Int. Edn 46, 750-753 (2007).
Park, Mi-Hee et al., "Silicon nanotube battery anodes," Nano Letters 2009, vol. 9, No. 11 3844 3847, Sep. 11, 2009.
Park, Mi-Hee et al., "Supporting information for silicon nanotube battery anodes," Nano Letters 2009, vol. 9, No. 11 3844-3847, Sep. 11, 2009.
Ping-Ping, F., et al., Amorphous Silicon Film Anode for Lithium-ion Battery, Chinese Journal of Inorganic Chemistry, vol. 22, No. 10, Oct. 2006, 5 pages.
Quasi-2D Structures Make Better Batteries, Tyrell, James, Apr. 17, 2008, pp. 1-2.
Ryu, J.H., et al Failure modes of silicon powder negative electrode in lithium secondary batteries. Electrochem. Solid-State Lett. 7, A306-A309 (2004).
Samudrala, S.K. et al., "Hybrid Nanocomposite for Nanotechnology," 2009, p. 245.
Sharma et al., "Diameter control of Ti-catalyzed silicon nanowires," Journal of Crystal Growth 267 (2004) 613-618, Apr. 20, 2004.
Sharma et al., "Structural characteristics and connection mechanism of gold-catalyzed bridging silicon nanowires," Journal of Crystal Growth 280 (2005) 562-568.
Sharma et al., "Thermodynamic properties of the lithium-silicon system." Journal of the Electrochemical Society 123, 1763-1768 (Dec. 1976).
Softpedia, "Silicon can improve lithium-ion batteries," downloaded from http://news.softpedia.com/news/silicon-can-improve-lithium-ion-batteries-161142.shtml on Oct. 21, 2010.
Song et al., "Arrays of sealed silicon nanotubes as anodes for lithium ion batteries," Nano Letters, American Chemical Society, Jan. 11, 2010.
Sun et al, Synthesis of Nickel Mono-Silicide Nanowire by Chemical Vapor Deposition on Nickel Film: Role of Surface Nickel Oxides, Japanese Journal of Applied Physics, vol. 48, No. 4, Apr. 1, 2009, p. 84C138, XP855323364.
Sweet nanotech batteries: Nanotechnology could solve lithium battery charging problems, PhysOrg.com, Received online Mar. 23, 2012 from http://phys.org/news127043619.html.
Uehara et al., "Thick vacuum deposited silicon films suitable for the anode of Li-ion battery," Journal of Power Sources 146, 441-444 (2005).
Wang, Y., et al. Epitaxial growth of silicon nanowires using an aluminum catalyst. Nature Naotech. 1, 186-189 (2006).
Westwater et al., "Growth of silicon nanowires via gold/silane vapor-liquid-solid reaction," Journal Va. Sci. Technology B 15(3), 554-557 (May/Jun. 1997).
Wu, Y. et al. Controlled growth and structures of molecular-scale silicon nanowires. Nao Lett. 4, 433-436 (2004).
Yazawa et al., "Effect of one monolayer of surface gold atoms on the epitaxial growth of InAs nanowhiskers," Appl. Phys. Lett. 61 (17), 2051-2053 (Oct. 1992).
Ying et al., "Characterization of SnO2 nanowires as anode materials for Li-ion batteries." Applied Physics Letters 87(11), 2005 (Abstract only).
Zhang, Hong-Li et al., "The facile synthesis of nickel silicide nanobelts and nanosheets and their application in electrochemical energy storage," Nanotechnology 19 (2008) 165606, (7 pp), Mar. 20, 2008.
Zhang, Y., et al., "Pyrolytic Carbon-Coated Silicon/Carbon Nanotube Composites: Promising Application for Li-ion Batteries," Int. J. Nanomanufacturing, vol. 2, Nos. 1/2, 2008, pp. 4-15.
Zhou, Controlled Li Doping of Si Nanowires (Applied Physics Letters vol. 75, No. 16), Oct. 18, 1999.
U.S. Appl. No. 16/748,393, filed Jan. 21, 2020, Fasching et al.
KR Office Action dated Aug. 17, 2022 in Application No. KR10-2016-7034189.
U.S. Appl. No. U.S. Appl. No. 17/323,575, inventors Loveness et al., filed May 18, 2021.
Extended European search report dated Oct. 7, 2022, in Application No. EP20759398.9.
JP Office Action dated Jun. 21, 2021 issued in Application No. 2016-567613 with English translation.
JP Office Action dated Nov. 15, 2022, in Application No. JP2021-066099 with English translation.
KR Office Action dated Aug. 17, 2022 in Application No. KR10-2016-7034189 with English translation.
U.S. Corrected Notice of Allowance dated Oct. 5, 2023, in U.S. Appl. No. 17/323,575.
U.S. Non-Final Office Action dated Feb. 23, 2023 in U.S. Appl. No. 17/323,575.
U.S. Non-Final office Action dated Jan. 12, 2023 in U.S. Appl. No. 17/524,206.
U.S. Non-Final Office Action dated Jun. 27, 2023, in U.S. Appl. No. 17/493,740.
U.S. Non-Final Office Action dated Sep. 22, 2023, in U.S. Appl. No. 16/949,201.
U.S. Notice of Allowance dated Aug. 9, 2023 in U.S. Appl. No. 17/524,206.
U.S. Notice of Allowance dated Sep. 7, 2023, in U.S. Appl. No. 17/323,575.
U.S. Notice of Allowance dated Sep. 14, 2023, in U.S. Appl. No. 17/323,575.
U.S. Restriction requirement dated May 12, 2023, in U.S. Appl. No. 16/949,201.
Wikipedia., "Lithium-silicon Battery," 9 pages. Available online at https://en.wikipedia.org/wiki/Lithium%E2%80%93siliconbattery, date unknown.
JP Office Action dated Feb. 6, 2024 in JP Application No. 2021-549268 with English translation.
U.S. Final Office Action dated Mar. 5, 2024 in U.S. Appl. No. 17/493,740.
U.S. Notice of Allowance dated Jan. 12, 2024 in U.S. Appl. No. 17/323,575.
U.S. Notice of Allowance dated Nov. 22, 2023 in U.S. Appl. No. 17/524,206.
U.S. Appl. No. 18/394,995, inventors Wang W, et al., filed Dec. 22, 2023.
CN Notification to Grant dated Mar. 6, 2020, issued in Application No. 201580032057.2.
JP Examiner's Report dated Dec. 8, 2020 issued in Application No. 2016-567613.
JP Office Action dated Apr. 7, 2020 issued in Application No. 2016-567613.
JP Office Action dated Feb. 8, 2022, in Application No. JP2021-066099.
JP Office Action dated Jun. 29, 2021 issued in Application No. 2016-567613.
JP Office Action dated Mar. 22, 2022 issued in Application No. 2016-567613.
JP patent application No. 2012-513226, Japanese Office Action mailed Apr. 4, 2014.

(56) References Cited

OTHER PUBLICATIONS

JP Written Statement dated Aug. 26, 2021 issued in Application No. 2016-567613.
KR Office Action dated Oct. 18, 2021 issued in Application No. 10-2016-7034189.
"Low Pressure Chemical Vapor Deposition Systems," 2020, https://www.mksinst.com/n/lpcvd-systems, 3 pages.
Ulvestad, A., et al. "Long-term Cyclability of Substoichiometric Silicon Nitride thin Film Anodes for Li-ion Batteries," Scientific Reports DOI:10.1038/s41598-017-13699-0, Oct. 17, 2017, pp. 1-10.
U.S. Appl. No. 17/493,740, inventors Lui et al., filed Oct. 4, 2021.
US Final Office Action dated Feb. 19, 2021, issued in U.S. Appl. No. 15/931,470.
US Final Office Action dated Jul. 2, 2021, issued in U.S. Appl. No. 15/694,470.
US Notice of Allowance (Corrected) dated Jul. 27, 2021, issued in U.S. Appl. No. 15/931,470.
US Notice of Allowance dated Jul. 14, 2021, issued in U.S. Appl. No. 15/931,470.
US Notice of Allowance dated May 21, 2020, issued in U.S. Appl. No. 16/109,609.
US Notice of Allowance issued Jan. 25, 2021, issued in U.S. Appl. No. 16/264,456.
US Notice of Allowance issued on Jun. 9, 2020 in U.S. Appl. No. 15/887,809.
US Notice of Allowance mailed Feb. 22, 2013 for U.S. Appl. No. 13/564,324.
US Office Action dated Oct. 9, 2020, issued in U.S. Appl. No. 15/694,470.
US Office Action dated Sep. 21, 2020, issued in U.S. Appl. No. 15/931,470.
US Office Action issued Sep. 20, 2020, issued in U.S. Appl. No. 16/264,456.
US Office Action mailed Sep. 17, 2012 for U.S. Appl. No. 13/564,324.
U.S. Appl. No. 13/914,491, Office Action mailed Dec. 3, 2014.
Westra, et al. "Formation of thin-film crystalline silicon on glass observed by in-situ XRD," Energy Procedia 2, 2010, pp. 235-241.
WO International Preliminary Report on Patentability dated Nov. 24, 2016, issued in Application No. PCT/US15/30336.
WO International Preliminary Report on Patentability dated Sep. 2, 2021.
WO International Search Report and Written Opinion dated Jun. 17, 2020.
CN Office Action dated Jul. 5, 2024 in CN Application No. 202080023849.4 with English translation.
TW Office Action dated May 16, 2024 in TW Application No. 109105775 with English translation.
U.S. Final Office Action dated Jun. 26, 2024 in U.S. Appl. No. 16/949,201.

* cited by examiner

COMPOSITIONALLY MODIFIED SILICON COATINGS FOR USE IN A LITHIUM ION BATTERY ANODE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Field of the Invention

This invention relates generally to nanostructures, and, more specifically, to multilayered silicon nanowire structures that are useful in battery anodes.

Much work has been done to find a way to use silicon in lithium battery anodes. Silicon holds much promise as it has ten times more lithium capacity than currently-used graphite. But, unfortunately, in absorbing so much lithium, silicon swells by 400%, which usually results in crumbling of the silicon and a short battery lifetime.

SUMMARY

One aspect of the disclosure relates to an anode for a lithium battery including a substrate; an array of nanowires rooted to the substrate, the nanowires each having a surface; a first layer coating most or all of the surfaces of the nanowires, the layer comprising a $SiE_x$ material; and a second layer over the first layer, any exposed surfaces of the nanowires, and the substrate, the second layer comprising either silicon or a $SiF_y$ material; wherein x greater than zero and less than 1; wherein y is greater than zero and less than 1; and wherein E and F is each selected independently from the group consisting of nitrogen, carbon, boron, phosphorus, oxygen, magnesium, aluminum, germanium, tin, nickel, copper, and combinations thereof. In some embodiment, wherein x is between 0.01 and 0.5, between 0.01 and 0.3, or between 0.01 and 0.1. In some embodiment, wherein y is between 0.01 and 0.5, between 0.01 and 0.3, or between 0.01 and 0.1. Lower values of x and/or y may be used in some embodiments.

In some embodiments, the concentration profile of E varies through a thickness of the first layer and/or the concentration profile of F varies through a thickness of the second layer. In some embodiments, the density of the second layer is greater than the density of the first layer. In some embodiments, the average density of the first layer is less than 2.1 $g/cm^3$. In some embodiments, the average density of the second layer is greater than 2.0 $g/cm^3$. In some embodiments, the density of the first layer varies throughout the first layer. In some embodiments, the density of the second layer varies throughout the second layer. In some embodiments, the first layer is non-conformal to the nanowire template. In some embodiments, the second layer is conformal to the first layer. In some embodiments, the anode further includes a third layer over the second layer, the third layer comprising no silicon. In some embodiments, the nanowire template includes silicide nanowires. In some embodiments, the first layer is between about 5 and 20 microns thick at its maximum diameter. In some embodiments, the second layer is between 5 and 500 nanometers thick. In some embodiments, the second layer is between 5 and 100 nanometers thick.

Another aspect of the disclosure relates to a lithium battery, including an anode as described herein; a lithium-containing cathode; and an electrolyte in ionic communication with both the anode and the cathode.

Another aspect of the disclosure relates to a method of making an anode for a lithium battery, including providing a substrate; growing nanowires from the substrate, the nanowires each having a surface; using a PECVD method to deposit a first layer to coat most or all of the surfaces of the nanowires, the first layer comprising a first silicon-rich $SiE_x$; using a thermal CVD method to deposit a second layer over the first layer, any exposed surfaces of the nanowires, and the substrate, the second layer comprising a second silicon-rich $SiE_x$.

In some embodiments, the PECVD method is an expanding thermal plasma method. In some embodiments, the nanowires are silicide nanowires. In some embodiments, chamber pressure during the thermal CVD method is less than about 2 Torr.

These and other aspects of the disclosure are described further below with reference to the Drawings.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
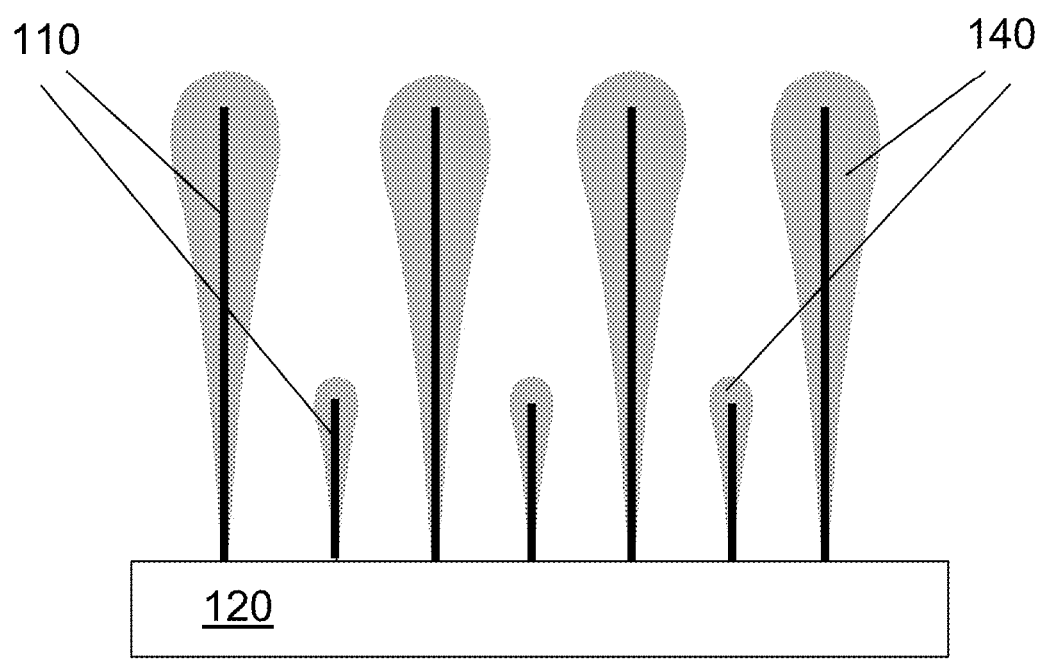
FIG. 1 is a schematic illustration of nanowires over which a silicon-based material layer has been deposited using PECVD (plasma enhanced chemical vapor deposition).

Certain embodiments are illustrated in the context of silicon deposition onto silicide nanowires in order to form anode structures for lithium battery cells. The skilled artisan will readily appreciate, however, that the materials and methods disclosed herein will have application in a number of other contexts where it is useful to adjust deposition to produce layers or particles with specific characteristics. For example, various embodiments are described herein with reference to nanowires. It should be understood, however, that unless otherwise stated, the references herein to nanowires include other types of nanostructures as described in U.S. Pat. No. 8,257,866, incorporated by reference herein, such as nanotubes, nanoparticles, nanospheres, nanorods, nanowhiskers, and the like.

Generally, the term "nanostructures" refers to structures having at least one dimension that is less than about 1 micron. In some embodiments, the structure has at least one dimension that is less than 500 nanometers, or 100 nanometers. This dimension could be a diameter of the nanostructure (e.g., a silicide template nanowire) or of a final coated structure. However, any of the overall dimensions (length and diameter) of the final coated structure do not have to be at a nanoscale. For example, a final structure may include a layer that is about 10 microns in thickness at its greatest diameter and coated over a template that is about 100 nanometers in diameter and 20 microns in length. While this overall structure is about 10.1 microns at its greatest diameter and 20 microns in length, it could be generally referred to as a "nanostructure" because of the dimensions of the template. In specific embodiments, the term "nanowire" refers to structures with nano-scaled shells positioned over elongated template structures.

In various embodiments, nanowires (as a specific case of nanostructures) have an aspect ratio of greater than one, at least about two, or at least about four. In various embodiments, nanowires have an aspect ratio of at least 10, at least 100, or at least 500. Nanowires may connect to other electrode components (e.g., a conductive substrate, other active material structures, or conductive additives). For example, nanowires may be substrate rooted such that one end of a nanowire is in contact with a substrate.

The term "silicon-based material" refers to material that is solely silicon or material that is silicon-rich $SiE_x$, in which E is any element or elements that can form intermetallic or alloy compounds with silicon, such as nitrogen, carbon, boron, phosphorus, oxygen, magnesium, aluminum, germanium, tin, nickel, copper, and combinations thereof. Silicon is at least 50 atomic % of the silicon-based material.

There may be more than one element E mixed with the silicon. In such cases, x is the sum of the values of the elements (e.g., $SiE1_{x1}E2_{x2}$; $x=x_1+x_2$, etc). In various embodiments, the value for x is less than 1, between 0.001 and 0.5, between 0.005 and 0.3; between 0.01 and 0.3; between 0.03 and 3; between 0.01 and 0.1; and between 0.01 and 0.05.

As will be appreciated below, in some embodiments, a nanostructure includes two different layers of silicon-rich SiEx with E and/or x being the same and or different for each layer. A second SiEx material is alternately referred to as SiFy in such instances. It will thus be appreciated that any description of E and x herein may be applied to F and y, respectively. For example, F is any element or elements that can form intermetallic or alloy compounds with silicon, such as nitrogen, carbon, boron, phosphorus, oxygen, magnesium, aluminum, germanium, tin, nickel, copper, and combinations thereof and y can be independently any value described for x, independent of particular x value.

In some embodiments, the nanostructures described herein can be made by first growing a nanowire template structure on a substrate. In many embodiments, the nanowire template structure is made of a conductive material. Examples of conductive materials that can be used to form nanowire template structures include metals and metal silicides. In some embodiments, a conductive template may include an oxide. The nanowire template structure is then coated with one or more layers of silicon-based electrode active material(s). Thermal CVD (chemical vapor deposition), HWCVD (hot-wire CVD), PECVD (plasma enhanced chemical vapor deposition), and/or evaporation (with or without thermal or laser assistance) may be used to deposit silicon-based electrode active material layers.

Various deposition processes produce different profiles when depositing silicon-based electrode active material layers onto nanowire templates. For example, thermal CVD creates a conformal amorphous silicon-based electrode active material coating. HWCVD (also known as catalytic CVD) makes a high density, non-conformal amorphous silicon-based electrode active material coating that is thicker at or near the tips of the nanowires and thinner at the roots of the nanowires near the substrate. PECVD also produces a non-conformal amorphous silicon-based electrode active material coating that is thicker at the ends of the nanowires and thinner at the roots of the nanowires near the substrate. The PECVD coating has a low density with many small voids.

Silicon-rich $SiE_x$ includes silicon compounds in which x is less than 1 or any range subsumed therein.

In some embodiments of the invention, silicon-rich $SiE_x$ is deposited onto a nanowire template using PECVD in a reaction chamber. Examples of process gases that may be used for such a deposition include, but are not limited to, silane ($SiH_4$) diluted with hydrogen or argon, and mixed with element(s) E precursors. Such gases become reactive species and generate silicon-rich $SiE_x$ coatings on surfaces of the nanowire template under AC/DC plasma. The amount of element(s) E, and thus the value of x, can be controlled by adjusting the ratio of the process gases. Reaction chamber temperature may be in the range of 200° C. to 600° C. or 300° C. to 500° C. Plasma power may be in the range of 500 W-1000 W, depending on the chamber size. Pressure in the process chamber may be in the range of 1 to 200 mTorr.

Initially, PECVD may deposit a very thin silicon-based electrode active material layer with a thickness less than 1 micron or between 0.1 and 0.4 microns onto the nanowire template along all surfaces, including on the substrate and at the roots of the nanowires adjacent to the substrate. But, as the deposition continues, more and more silicon-based electrode active material accumulates at or near the tips of the nanowires in the nanowire template, shadowing the substrate regions. The result is that the very thin layer of silicon-based electrode active material on the substrate may or may not be continuous, depending on the density and uniformity of nanowires along the substrate surface.

FIG. 1 is a schematic illustration of nanowires over which a silicon-rich $SiE_x$ layer has been deposited using PECVD. A nanowire template 110 is rooted to a substrate 120. A silicon-based electrode active material ($SiE_x$) layer 140 is deposited onto the nanowire template 110. Note that the $SiE_x$ layer 140 is thickest at or near the tips of the nanowires of the nanowire template 110 and tapers off until there is little or no $SiE_x$ at the roots of nanowires. The $SiE_x$ layer 140 is a non-conformal coating, that is, it does not conform to the shape onto which it is deposited. FIG. 1 shows an example where there is essentially no $SiE_x$ on the substrate 120 either. In some arrangements, there is a thin continuous $SiE_x$ layer on the substrate 120. In some arrangements, there is a thin discontinuous $SiE_x$ layer on the substrate 120. In some arrangements, some or all of the nanowire regions adjacent to the substrate (the roots of the nanowires) have a thin (0.1-0.4 microns) coating of $SiE_x$.

Figure 2:
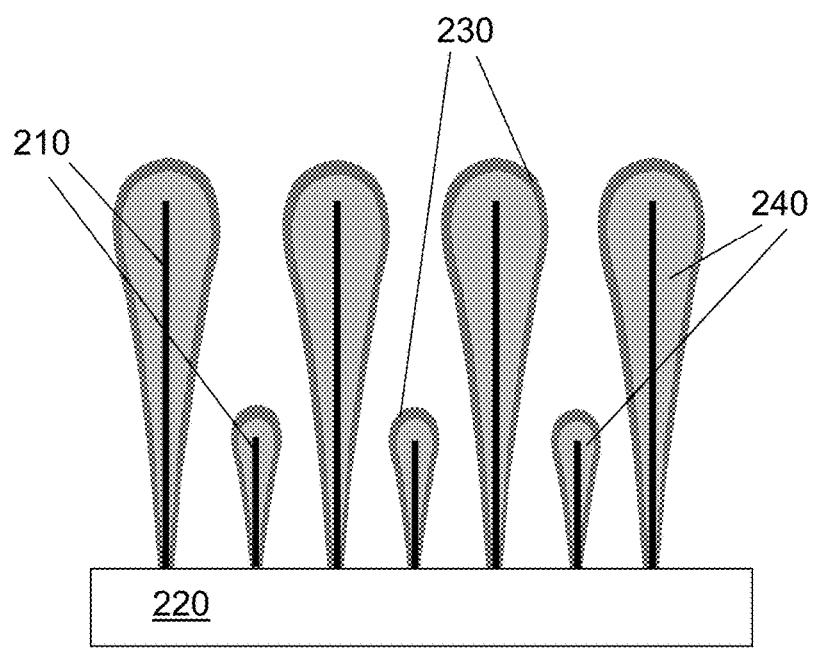
FIG. 2 is a schematic illustration of nanowires over which a first silicon-based material layer has been deposited using PECVD and then a second silicon-based material layer has been deposited using thermal CVD, according to an embodiment of the invention.

FIG. 2 is a schematic illustration of a nanowire template over which two silicon-based electrode active material layers have been deposited, according to an embodiments. The two different deposition methods have been used to provide optimum silicon-based electrode active material coatings. A nanowire template 210 is rooted to a substrate 220. A first silicon-based electrode active material layer 240 which contains silicon-rich $SiE_x$ has been deposited onto the nanowire template 210 using PECVD. The first $SiE_x$ layer 240 has a profile that is thickest at or near the tips of the nanowires of the nanowire template 110 and tapers off until there is little or no $SiE_x$ at the roots of nanowires. In some embodiments, the first silicon layer 240 has a thickness between 0.5 and 50 microns, between 0.5 and 20 microns thick, or between 10 and 20 microns thick at or near the tips of the nanowires. A second silicon-based electrode active material layer 230 which contains silicon-rich $SiE_x$ has been deposited onto the nanowire first layer 240 using thermal CVD. (As indicated above, the identity and/or amount of element "E" may be the same or different than in the first silicon-based electrode active material layer 240; the material may be referred to a silicon-rich $SiF_y$ to distinguish it from the silicon-rich $SiE_x$ material in the layer 240). In some embodiments, the second $SiE_x$ layer 230 has a thickness between 5 and 500 nm, between 10 and 200 nm, or between 10 and 90 nm thick. The second $SiE_x$ layer 230 is a conformal coating, that is, it conforms to the shape onto which it is deposited. The second $SiE_x$ layer 230 is conformal to the surface of the first silicon-based electrode active material layer 240, the substrate 220, and any exposed portions of the nanowire template 210. The second $SiE_x$ layer 230 has approximately uniform thickness. The resulting structure has much more silicon-based electrode active material (due to the non-conformal nature of the first silicon-based electrode active material layer 240) at or near the tips of the nanowires than at the root ends.

The first $SiE_x$ layer 240 has a surface roughness and a porosity. The thickness of the second $SiE_x$ layer 230, which has a smoother surface than does the first $SiE_x$ layer 240, may be adjusted to mitigate the surface roughness of the first $SiE_x$ layer 240. A smooth $SiE_x$ second layer 230 reduces the overall surface area of the coated nanowire. A reduced surface area means there is less surface on which an SEI (solid electrolyte interphase) layer can form as a battery cycles. Less SEI means less lithium consumption leaving more lithium available for cycling. In some arrangements, it is useful to increase the thickness of the second $SiE_x$ layer 230 as the surface roughness of the first $SiE_x$ layer increases. In some arrangements, the thickness of the second $SiE_x$ layer 230 is between Sand 500 nm, between 10 and 200 nm, or between 10 and 90 nm thick.

The structures described herein have many advantages. In some embodiments, there is more $SiE_x$ material near the tip of the nanowire than at the root, but there is still a thin layer of $SiE_x$ material at the root. Having such a thin silicon layer at the root strengthens the mechanical connection between the nanowires of the nanowire template and the substrate, helping to ensure that the nanowires do not separate from the substrate during cycling.

Another advantage is that PECVD $SiE_x$ layers are not as dense as the thermal CVD $SiE_x$ layers. The $SiE_x$ layers made using PECVD may contain a large volume of voids and pores. Such defects can be very helpful in providing space into which the silicon-based electrode active material can expand as it absorbs lithium during battery cell charging.

In some arrangements, even small amounts of the additional element E supports and buffers the swelling of the silicon-based electrode active material as it absorbs lithium ions, which reduces cracking of the silicon-based electrode active material and improves reversibility and cycle life for the battery cell. The element E also dramatically improves lithium ion transport through the silicon-based electrode active material. In some embodiments, the element(s) E combines with silicon to create a structure that disperses nanosized silicon domains in a material matrix. The silicon grains or domains retain their nano-size dimensions for a larger number of cycles due to the physical separation of the silicon grains by the structure. Further, unlike $SiO_2$, which reacts with lithium upon lithiation to irreversibly forming lithium silicate compounds and results in a very high first cycle loss and cell capacity reduction, the silicon-rich $SiE_x$ materials do not result in high first cycle loss and cell capacity reduction. In some embodiments, the level of E in a silicon-rich layer is at least 0.005, 0.01, 0.05, 0.07, 0.1, or 0.15.

In some embodiments, the level of E in a silicon-rich layer is maintained at a level such that there is sufficient amount of silicon active material available. In some embodiments, the level x of E in $SiE_x$ in one or both of the layers is no more than 0.3, 0.2, 0.15, 0.1, 0.07, 0.05, 0.03, 0.01. In some embodiments, only one of the two layers includes a $SiE_x$ layer with the other layer being pure silicon or including another element.

In some embodiments, the first $SiE_x$ silicon layer which is deposited using PECVD is amorphous and has an average density that is less than 2.25 $g/cm^3$, less than 2.10 $g/cm^3$, or less than 1.70 $g/cm^3$, and may include many small voids. The second $SiE_x$ layer which is deposited using thermal CVD s amorphous and has an average density greater than 2.0 $g/cm^3$ or greater than 2.25 $g/cm^3$. In some embodiments, the densities of the two layers may be described in terms of a density difference between the layers, rather by their absolute densities. In some embodiments, the second $SiE_x$ layer has an average density that is at least 0.05 $g/cm^3$, at least 0.1 $g/cm^3$, at least 0.2 $g/cm^3$, at least 0.3 $g/cm^3$, greater than the average density of the first layer. As would be understood by a person of ordinary skill in the art, densities of amorphous silicon-based electrode active materials are less than the densities of the same materials with crystalline or polycrystalline morphologies.

According to various embodiments, the nanostructures described herein may be characterized as having a second $SiE_x$ layer over a first $SiE_x$ layer, the second layer having a density higher than the density of the first layer. Such structures can be used to form anodes in a lithium battery cell. In some embodiments, the first $SiE_x$ layer is amorphous with a low density and may also contain some voids, all or which serves to provide space into which the $SiE_x$ can expand as it absorbs lithium ion during cell cycling. This is an advantage over crystalline or polycrystalline silicon-based electrode active materials which have higher densities and may undergo stress cracking as they absorb lithium ions. In addition, it is easier for lithium ions to diffuse through an amorphous material than through a crystalline or polycrystalline silicon-based electrode active material. As such, the densities of each layer may be adjusted depending on the silicon cycling capacity, power or cycling rate requirements and nanowire template density.

In certain embodiments, anodes for lithium battery cells are formed from nanowire template structures that are rooted on a conductive substrate that may serve as a current collector for the anode. Examples of conductive substrate materials include copper, copper coated with metal oxides, stainless steel, titanium, aluminum, nickel, chromium, tungsten, other metals, metal silicides and other conductive metal compounds, carbon, carbon fiber, graphite, graphene, carbon mesh, conductive polymers, doped silicon or combinations of above including multi-layer structures. The substrate may be formed as a foil, film, mesh, foam, laminate, wires, tubes, particles, multi-layer structure, or any other suitable configuration. In certain embodiments, a substrate is a metallic foil with a thickness of between about 1 micron and 50 microns or more specifically between about 5 microns and 30 microns.

The nanowires may be physically and conductively attached to the substrate. The physical attachment may be more than a simple mechanical contact, which might result, for example, from coating a binder with discrete nanostructures onto the substrate. In some embodiments, the physical attachment results from fusion of the nanostructures to the substrate or deposition of the nanostructures or some portion of the nanostructures directly onto the substrate, for example, using CVD techniques or using vapor-liquid-solid CVD growth. In some embodiments, physical attachment results from ballistic impalement of the nanowires onto the substrate. In various embodiments, physical attachment includes metallurgical bonds, such as a formation of alloys of two bonded materials (e.g., silicides). In other embodiments, nanowires are grown from the substrate using other nanowire growth techniques that produce structures with similar shapes and dimensions.

In many embodiments, the nanowires of the nanowire template contain metal or metal silicides and are electronically conductive. In some embodiments, the nanowires include one or more oxides. Conductive templates can be useful to provide an electronic transport path from the silicon-based electrode active material to the substrate or current collector. In various embodiments, nanowires in a nanowire template are between 10 nanometers and 100 nanometers in diameter and between 10 microns and 100 microns in length. Anodes for lithium battery cells that contain nanowire templates are further described in U.S. Pat. No. 7,816,031, which is incorporated by reference herein.

Figure 3:
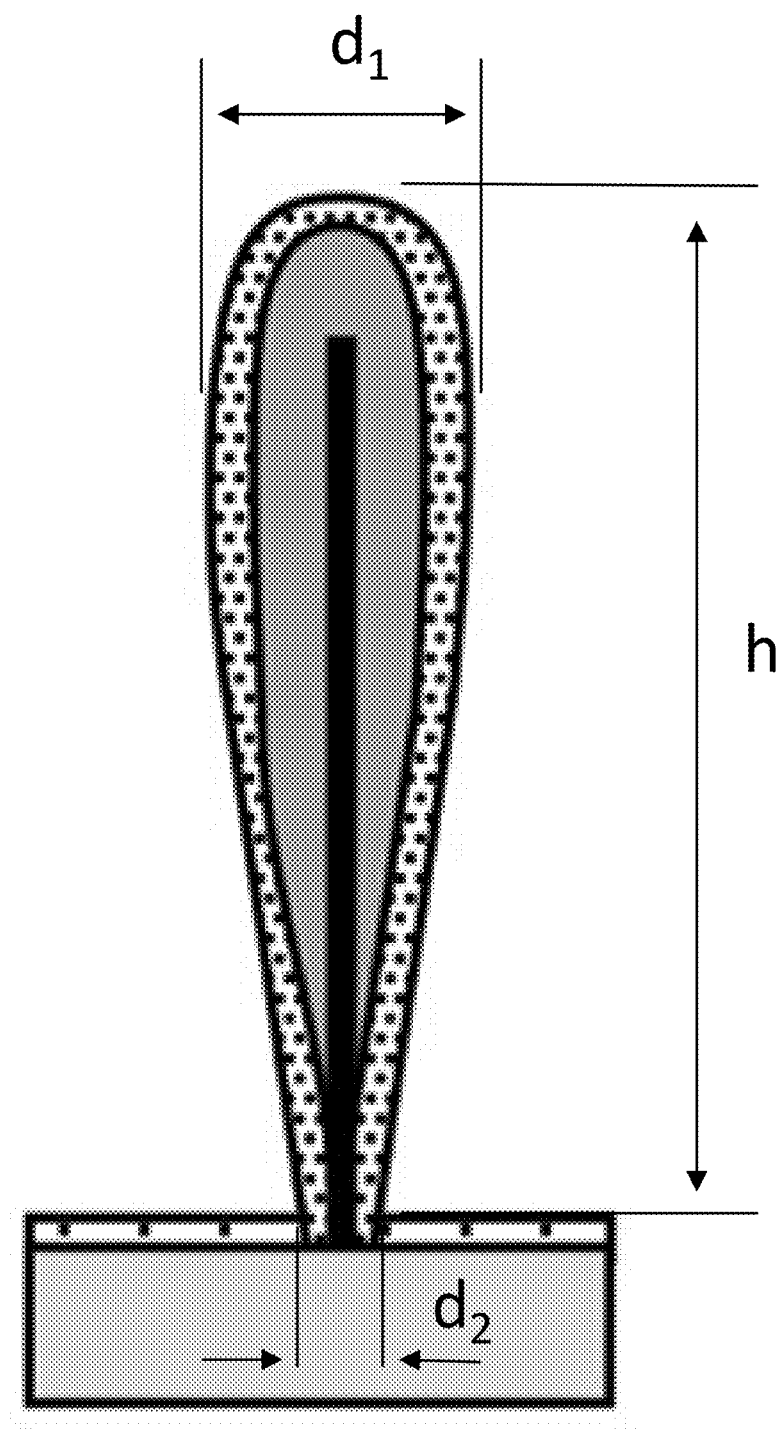
FIG. 3 shows a schematic depiction of a representation of a non-conformal silicon coating on a template nanowire.

In some embodiments, a silicon-based material nanostructure has a generally circular symmetry. It should be noted that an array of nanowires having generally circular symmetry includes arrays in which asymmetries may be introduced due to two nanowires being close enough that their coatings abut one another FIG. 3 shows a schematic cross section drawing that shows a nanowire that has been coated with two $SiE_x$ layers that have deposited using different deposition methods, as described herein. The dimensions d1, d2 and h are labeled: d1 is the largest diameter of the coating, d2 is the bottom diameter of the coating, and h is the height of the coated nanowire. The non-conformal coating (porous non-conformal coating alone, or porous non-conformal coating conformally coated with the dense coating) may be characterized in some embodiments by the following ratios: d1/h of 1/2 to 1/9, d2/h of 1/400 to 1/70 and a d1/d2 ratio of 50:1 to 1.5:1. In various embodiments, d1 is between 4 and 15 microns or between 4 and 12 microns; d2 is between 0.2 and 2 microns; and h is between 20 and 50 microns or between 30 and 40 microns.

In one example, a nanowire having a diameter of about 10 to 50 nm and a length of between about 10 to 25 microns is coated with silicon-rich silicon nitride, such that after coating the diameter of the nanostructure at the root is 100 to 400 nm, the maximum diameter is 2 to 20 microns, and the total height of the anode is 20 to 50 microns.

In some embodiments, a silicon-based electrode active material non-conformal layer deposited by PECVD may include a hydrogen content of at least 10%. In some embodiments, a silicon-based electrode active material conformal layer deposited by thermal CVD may include a hydrogen content of no more than 7%, or no more than 5%.

In some embodiments, non-conformal, $SiE_x$ layers are deposited by evaporation or physical vapor deposition (PVD), or hot wire chemical vapor deposition (HWCVD) instead of or in addition to PECVD.

In a PECVD deposition process, a plasma may be generated either in a chamber in which a substrate is disposed or upstream of the chamber and fed into the chamber. Any type of plasma, including capacitively coupled plasmas, inductively coupled plasmas, and conductive coupled plasmas may be used. Any plasma source may be used, including DC, AC, RF and microwave sources.

PECVD process conditions can vary according to the particular process and tool used. A fairly wide range of temperatures, e.g., 180° C. to 600° C., may be used. Pressures are generally low for plasma processes, e.g., ranging from 1 mTorr to 400 Torr, or 10 mTorr to 100 mTorr, depending on the process.

In some implementations, the PECVD process used to form the novel structures described herein is an expanding thermal plasma chemical vapor deposition (ETP-CVD) process. In such a process, a plasma-generating gas is passed through a direct current arc plasma generator to form a plasma, with a web or other substrate including a nanowire template in an adjoining vacuum chamber. A silicon-based source gas is injected into the plasma, with radicals generated. The plasma is expanded via a diverging nozzle and injected into the vacuum chamber and toward the substrate, with a non-conformal layer of amorphous $SiE_x$ formed on the nanowire template. Examples of plasma generating gases include, but are not limited to, argon (Ar) and ammonium ($NH_3$), and nitrogen ($N_2$). In some embodiments, the ionized argon and $NH_3/N_2$ species in the plasma collide with silane molecules to form radical species of the silicon source, resulting in deposition of $SiE_x$ on the nanowire template. Example ranges for voltages and currents for the DC plasma source are 60 to 80 volts or 50 to 70 amperes.

In some embodiments, the conformal, dense silicon layers are deposited using as atomic layer deposition (ALD) instead of or in addition to thermal CVD. Any appropriate thermal CVD process may be used, such as low-pressure CVD (LPCVD). Temperatures may go as high as the thermal budget allows, as long as care is taken with metal substrates to ensure that no metal silicide is formed around the nanowire-substrate interface. In some embodiments, chamber pressure during a thermal CVD process is kept low, e.g., 100 mTorr to 2 Torr to prevent gas phase reactions and non-conformal deposition. Higher pressures, e.g., higher than 2 Torr or 500 Torr can result in non-conformal deposition.

Any appropriate silicon source combined with an element(s) E source may be used for the non-conformal and conformal $SiE_x$. Examples include, but are not limited to, silane ($SiH_4$), dichlorosilane ($H_2SiCl_2$), monochlorosilane ($H_3SiCl$), trichlorosilane ($HSiCl_3$), silicon tetrachloride ($SiCl_4$) for the silicon source, Examples for a nitrogen source include, but are not limited to, ammonium ($NH_3$) and nitrogen ($N_2$) to form the silicon-rich silicon nitride layers. Other elements can be introduced into the plasma from gas precursors (CH$_4$, GeH$_4$, B$_2$H$_6$ etc.) or vaporized liquid precursors, as would be the case of organometallic precursors.

Additional description of depositing active material layers having controlled densities may be found in U.S. patent application Ser. No. 13/277,821, incorporated by reference herein.

Still further, a non-Si dominant layer may be the outermost shell of the nanostructure in some embodiments. Examples of layers include metal oxides such as aluminum oxide, titanium oxide, cobalt oxide, and zirconium oxide, metal nitrides, and silicon nitrides or carbon based layers. In some embodiments, a thin layer of any of these may be deposited in addition to or instead of the dense Si layer described above.

In some embodiments the outer SiEx layer may be chemically modified at the surface by gas or solution phase treatment/exposure to add or remove elements and create a 1-10 nm thick layer of a different chemical composition, for example an oxide or a halide.

According to various embodiments, the first SiE$_x$ layers and the second SiE$_x$ layers each has a uniform density. In some embodiments, deposition conditions may be adjusted during deposition to provide a density gradient in one or both layers. For example, one or both layers may get denser toward the outer part of the layer. In such embodiments, an average density of the layer may be used to characterize the density of layer.

According to various embodiments, the first SiE$_x$ layers and the second SiE$_x$ layers each has a uniform concentration of the E element(s). SiE$_x$ refers to the total amount of Si and E in a layer. However, in some embodiments, deposition conditions may be adjusted during deposition to provide a concentration gradient in one or both layers. In one example, one or both layers may have an increase in E concentration toward the outer part of the layer. In another example, one or both layers may have a decrease in E concentration toward the outer part of the layer. In yet another example, one or both layers may have an E concentration that varies with both increases and decreases throughout the layer. In such embodiments, an average E concentration of the layer may be used to characterize the E concentration of layer. The concentration profile of E may be said to vary through the thickness of the layer. Concentration profiles that include one or more regions of flat (uniform) profile and one or more regions that increase and/or decrease are included.

Assembly

Figure 4A:
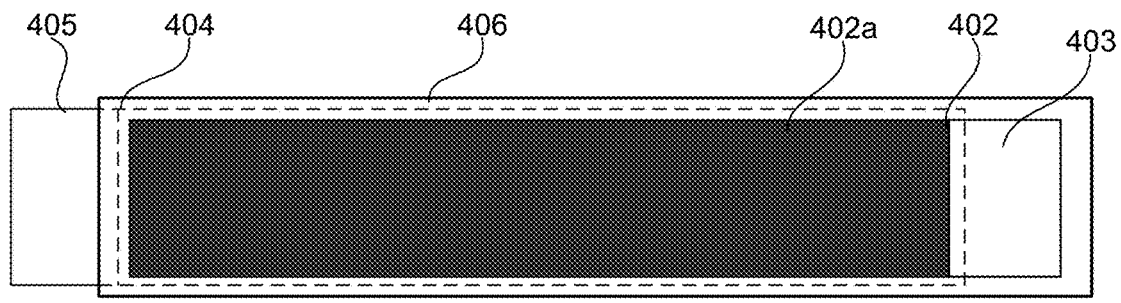
FIG. 4A is schematic representation of a plan view of a partially-assembled electrochemical cell that uses electrodes described herein, according to certain embodiments.

FIG. 4A is a plan view of a partially-assembled electrochemical cell that uses electrodes described herein, according to certain embodiments. The cell has a positive electrode active layer 402 that is shown covering a major portion of a positive current collector 403. The cell also has a negative electrode active layer 404 that is shown covering a major portion of a negative current collector 405. Separator 406 is between the positive electrode active layer 402 and the negative electrode active layer 404.

In one embodiment, the negative electrode active layer 404 is slightly larger than the positive electrode active layer 402 to ensure trapping of the lithium ions released from the positive electrode active layer 402 by the active material of the negative electrode active layer 404. In one embodiment, the negative electrode active layer 404 extends at least between about 0.25 millimeters and 7 millimeters beyond the positive electrode active layer 402 in one or more directions. In a more specific embodiment, the negative electrode active layer 404 extends beyond the positive electrode active layer 402 by between about 1 millimeter and 2 millimeters in one or more directions. In certain embodiments, the edges of the separator 406 extend beyond the outer edges of at least the negative electrode active layer 404 to provide the complete electronic insulation of the negative electrode from the other battery components.

Figure 4B:
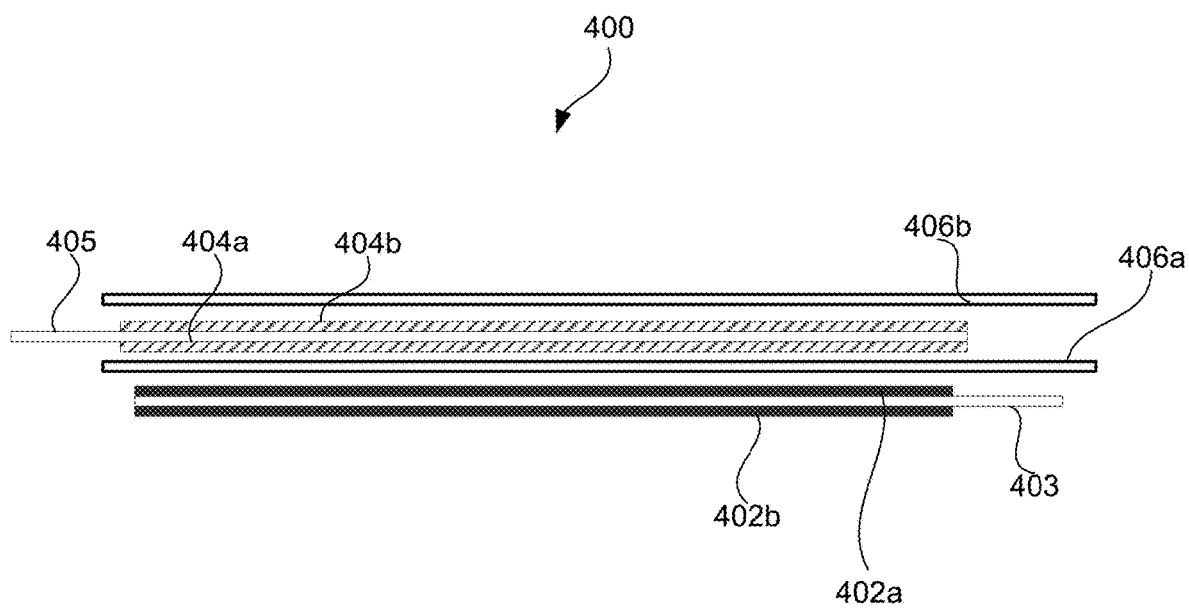
FIG. 4B is schematic representation of a cross-sectional view of an electrode stack of a partially-assembled electrochemical cell that uses electrodes described herein, according to certain embodiments.

FIG. 4B is a cross-sectional view of an electrode stack 400 of the partially-assembled electrochemical cell that uses electrodes described herein, according to certain embodiments. There is a positive current collector 403 that has a positive electrode active layer 402a on one side and a positive electrode active layer 402b on the opposite side. There is a negative current collector 405 that has a negative electrode active layer 404a on one side and a negative electrode active layer 404b on the opposite side. There is a separator 406a between the positive electrode active layer 402a and the negative electrode active layer 404a. The separator sheets 406a and 406b serve to maintain mechanical separation between the positive electrode active layer 402a and the negative electrode active layer 404a and acts as a sponge to soak up the liquid electrolyte (not shown) that will be added later. The ends of the current collectors 403, 405, on which there is no active material, can be used for connecting to the appropriate terminal of a cell (not shown).

Together, the electrode layers 402a, 404a, the current collectors 403, 405, and the separator 406a can be said to form one electrochemical cell unit. The complete stack 400 shown in FIG. 4B, includes the electrode layers 402b, 404b and the additional separator 406b. The current collectors 403, 405 can be shared between adjacent cells. When such stacks are repeated, the result is a cell or battery with larger capacity than that of a single cell unit.

Figure 5A:
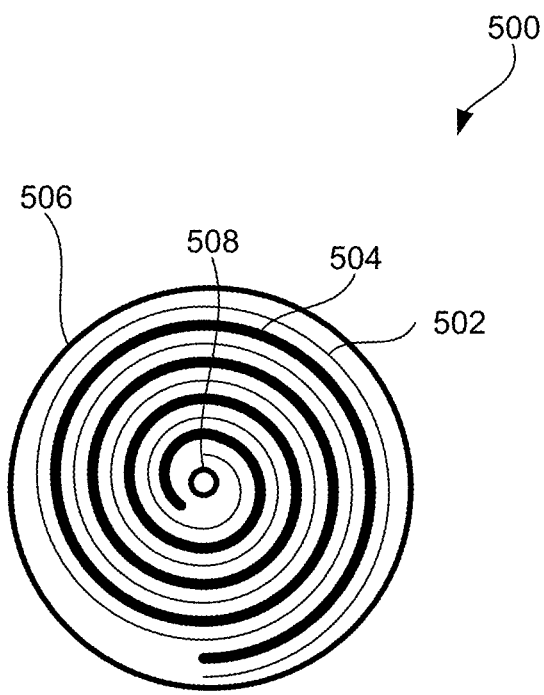
FIGS. 5A-5C are schematic representations of various views of electrodes wound together with two sheets of separator to form a cell according to certain embodiments.
Figure 5B:
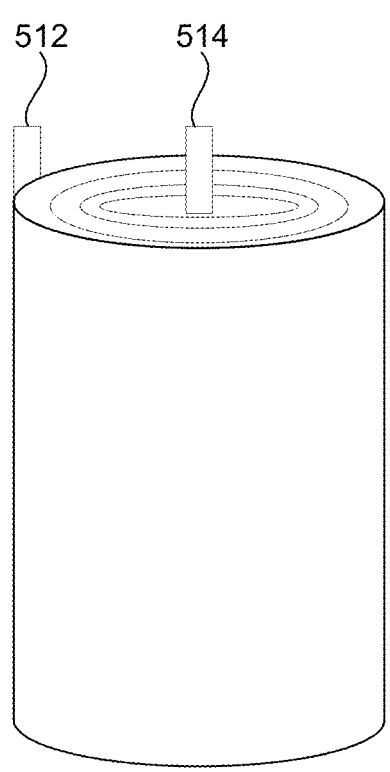

Another way to make a battery or cell with large capacity is to make one very large cell unit and wind it in upon itself to make multiple stacks. The cross-section schematic illustration in FIG. 5A shows how long and narrow electrodes can be wound together with two sheets of separator to form a battery or cell, sometimes referred to as a jellyroll 500. The jellyroll is shaped and sized to fit the internal dimensions of a curved, often cylindrical, case 502. The jellyroll 500 has a positive electrode 506 and a negative electrode 504. The white spaces between the electrodes are the separator sheets. The jelly roll can be inserted into the case 502. In some embodiments, the jellyroll 500 may have a mandrel 508 in the center that establishes an initial winding diameter and prevents the inner winds from occupying the center axial region. The mandrel 508 may be made of conductive material, and, in some embodiments, it may be a part of a cell terminal. FIG. 5B shows a perspective view of the jelly roll 500 with a positive tab 512 and a negative tab 514 extending from the positive current collector (not shown) and the negative current collector (not shown), respectively. The tabs may be welded to the current collectors.

The length and width of the electrodes depend on the overall dimensions of the cell and thicknesses of the active layers and the current collectors. For example, a conventional 18650-type cell with 18 mm diameter and 85 mm length may have electrodes that are between about 300 and 1000 mm long. Shorter electrodes corresponding to lower rate and/or higher capacity applications are thicker and have fewer winds.

A cylindrical design may be used for some lithium ion cells especially when the electrodes can swell during cycling and thus exert pressure on the casing. It is useful to use a cylindrical casing that is as thin as possible while still being able to maintain sufficient pressure on the cell (with a good safety margin). Prismatic (flat) cells may be similarly wound, but their case may be flexible so that they can bend along the longer sides to accommodate the internal pressure. Moreover, the pressure may not be the same within different parts of the cell, and the corners of the prismatic cell may be left empty. Empty pockets may be avoided within lithium ions cells because electrodes tend to be unevenly pushed into these pockets during electrode swelling. Moreover, the electrolyte may aggregate in empty pockets and leave dry areas between the electrodes, negatively affecting lithium ion transport between the electrodes. Nevertheless, for certain applications, such as those dictated by rectangular form factors, prismatic cells are appropriate. In some embodiments, prismatic cells employ stacks of rectangular electrodes and separator sheets to avoid some of the difficulties encountered with wound prismatic cells.

Figure 5C:
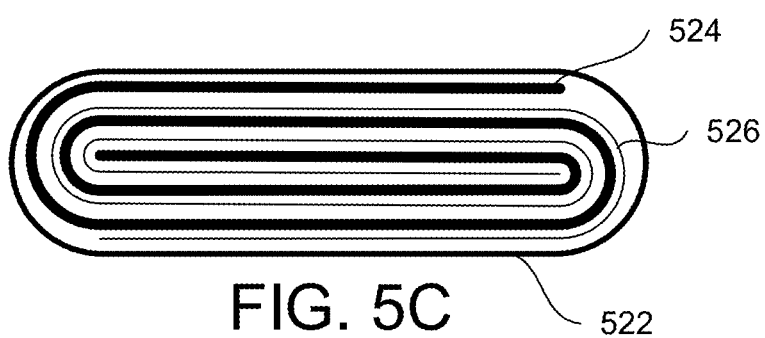

FIG. 5C illustrates a top view of a wound prismatic jellyroll 520. The jellyroll 520 includes a positive electrode 524 and a negative electrode 526. The white space between the electrodes is the separator sheet. The jelly roll 520 is enclosed in a rectangular prismatic case 522. Unlike the cylindrical jellyroll, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 6A:
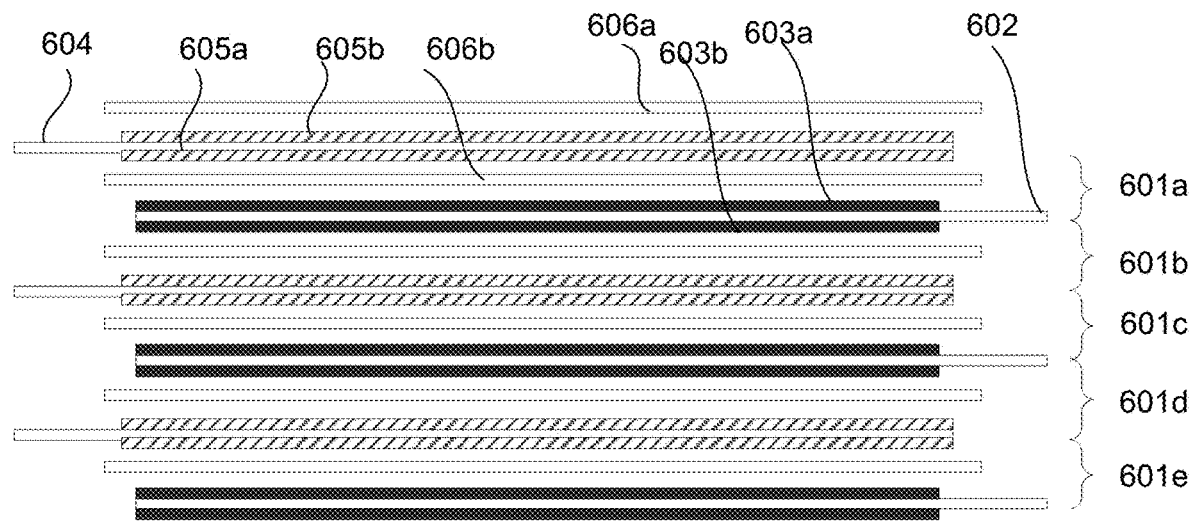
FIGS. 6A and 6B are schematic representations of cross-sectional and perspective views of a stacked cell that includes a plurality of cells according to certain embodiments.
Figure 6B:
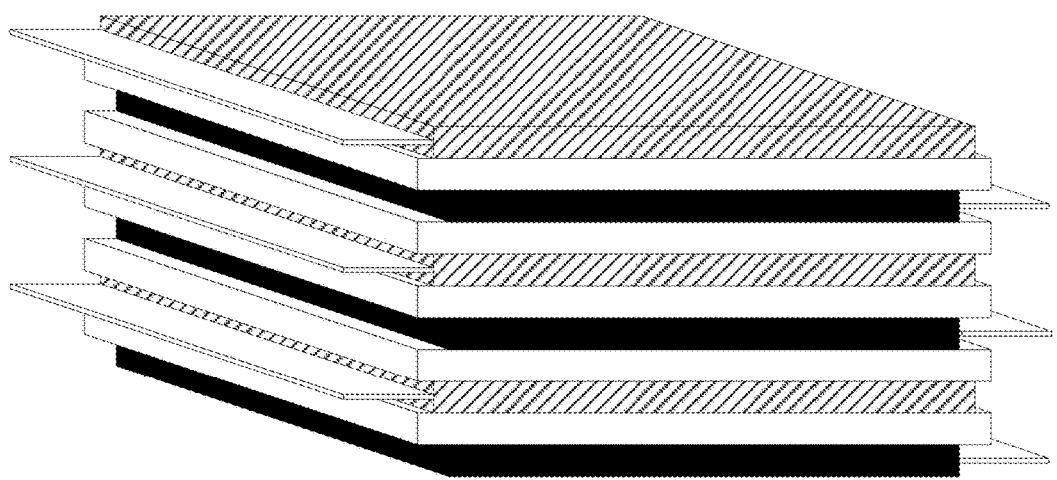

FIG. 6A illustrates a cross-section of a stacked cell that includes a plurality of cells (601a, 601b, 601c, 601d, and 601e), each having a positive electrode (e.g., 603a, 603b), a positive current collector (e.g., 602), a negative electrode (e.g., 605a, 605b), a negative current collector (e.g., 604), and a separator (e.g., 606a, 606b) between the electrodes. Each current collector is shared by adjacent cells. A stacked cell can be made in almost any shape, which is particularly suitable for prismatic batteries. The current collector tabs typically extend from the stack and lead to a battery terminal. FIG. 6B shows a perspective view of a stacked cell that includes a plurality of cells.

Once the electrodes are arranged as described above, the cell is filled with electrolyte. The electrolyte in lithium ions cells may be liquid, solid, or gel. The lithium ion cells with the solid electrolyte are referred to as a lithium polymer cells.

A typical liquid electrolyte comprises one or more solvents and one or more salts, at least one of which includes lithium. During the first charge cycle (sometimes referred to as a formation cycle), the organic solvent in the electrolyte can partially decompose on the negative electrode surface to form a SEI layer. The interphase is generally electrically insulating but ionically conductive, thereby allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4$, $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$, and $(CF_2)_3(SO_2)_{2x}Li$), and combinations thereof. Common combinations include $LiPF_6$ and $LiBF_4$; $LiPF_6$ and $LiN(CF_3SO_2)_2$; and $LiBF_4$ and $LiN(CF_3SO_2)_2$.

In one embodiment, the total concentration of salt in a liquid nonaqueous solvent (or combination of solvents) is at least about 0.3 M; in a more specific embodiment, the salt concentration is at least about 0.7M. The upper concentration limit may be driven by a solubility limit or may be no greater than about 2.5 M; in a more specific embodiment, it may be no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PNMA), polymethylacrylonitrile (PMAN), polysiloxanes and their copolymers and derivatives, acrylate-based polymer, other similar solvent-free polymers, combinations of the foregoing polymers either condensed or crosslinked to form a different polymer, and physical mixtures of any of the foregoing polymers. Other less conductive polymers that may be used in combination with the above polymers to improve the strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 7:
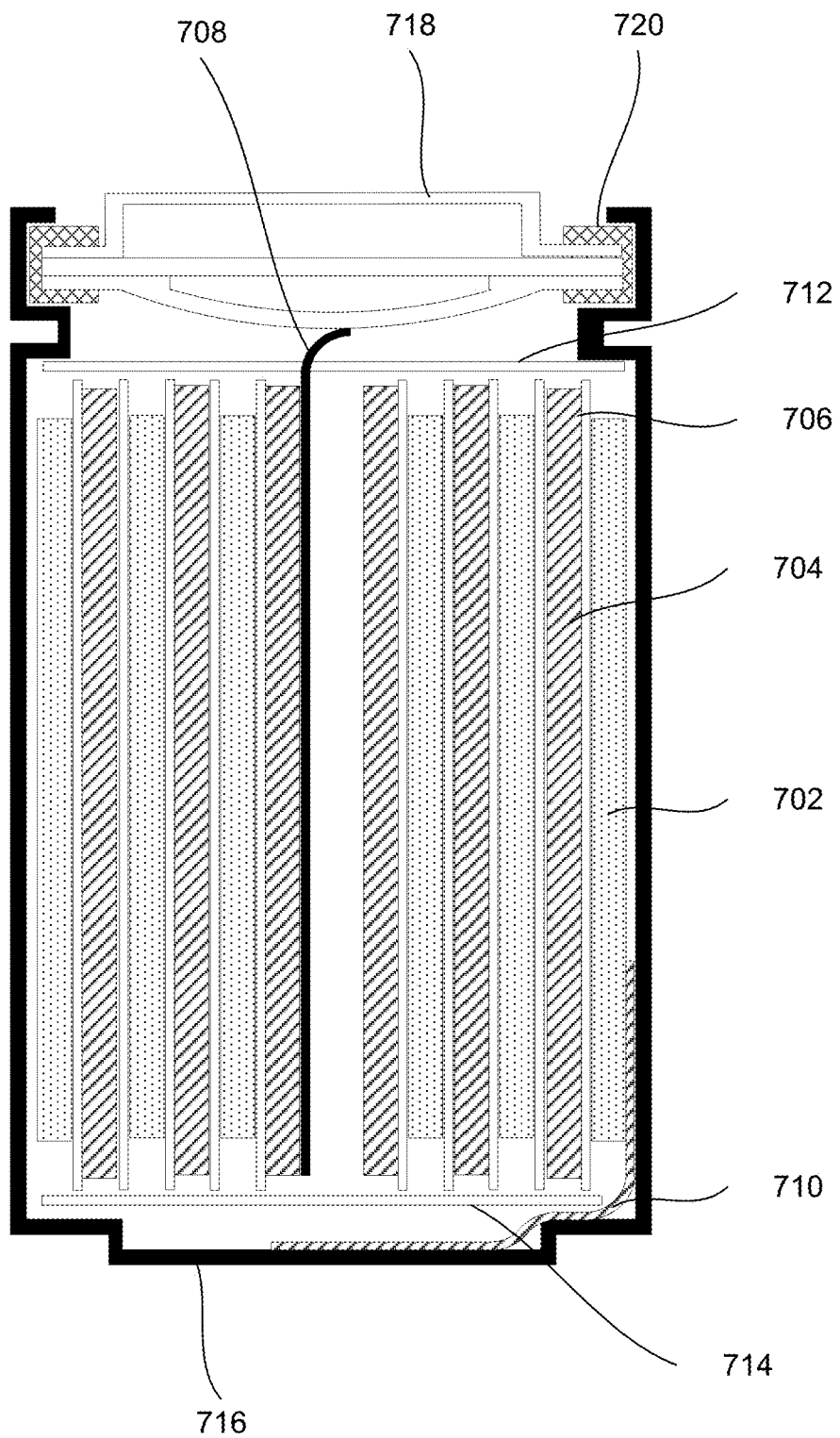
FIG. 7 is schematic representation of cross-sectional view of a wound cylindrical cell, in accordance with certain embodiments.

FIG. 7 illustrates a cross-section view of a wound cylindrical cell, in accordance with one embodiment. A jelly roll comprises a spirally wound positive electrode 702, a negative electrode 704, and two sheets of the separator 706. The jelly roll is inserted into a cell case 716, and a cap 718 and gasket 720 are used to seal the cell. It should be noted that in certain embodiments a cell is not sealed until after subsequent operations. In some cases, cap 718 or cell case 716 includes a safety device. For example, a safety vent or burst valve may be employed to open if excessive pressure builds up in the battery. In certain embodiments, a one-way gas release valve is included to release oxygen that has been released during activation of the positive material. Also, a positive thermal coefficient (PTC) device may be incorporated into the conductive pathway of cap 718 to reduce the damage that might result if the cell suffered a short circuit. The external surface of the cap 718 may be used as the positive terminal, while the external surface of the cell case 716 may serve as the negative terminal. In an alternative embodiment, the polarity of the battery is reversed and the external surface of the cap 718 is used as the negative terminal, while the external surface of the cell case 716 serves as the positive terminal. Tabs 708 and 710 may be used to establish a connection between the positive and negative electrodes and the corresponding terminals. Appropriate insulating gaskets 714 and 712 may be inserted to prevent the possibility of internal shorting. For example, a Kapton™ film may be used for internal insulation. During fabrication, the cap 718 may be crimped to the cell case 716 in order to seal the cell. However, prior to this operation, electrolyte (not shown) is added to fill the porous spaces of the jelly roll.

A rigid case is typically used for lithium ion cells, while lithium polymer cells may be packed into flexible, foil-type (polymer laminate) cases. A variety of materials can be chosen for the cases. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

In addition to the battery applications described above, the nanostructures may be used in fuel cells (e.g., for anodes, cathodes, and electrolytes), hetero-junction solar cell active materials, various forms of current collectors, and/or absorption coatings.

EXPERIMENTAL AND RESULTS

Nanowire templates on metal foil were exposed to silane, argon, and ammonium or nitrogen gases, inside PECVD plasma chamber, resulting in a first layer of silicon-rich $SiN_x$ layer deposited on the nanowire template. A second coating of a silicon-rich $SiN_x$ was deposited onto the first $SiN_x$ layer using thermal CVD to form an anode for a lithium battery cell. In addition to the anode fabricated above, the cell included a lithium cobalt oxide cathode, a separator and carbonate based electrolyte with $LiPF_6$ salt.

Figure 8:
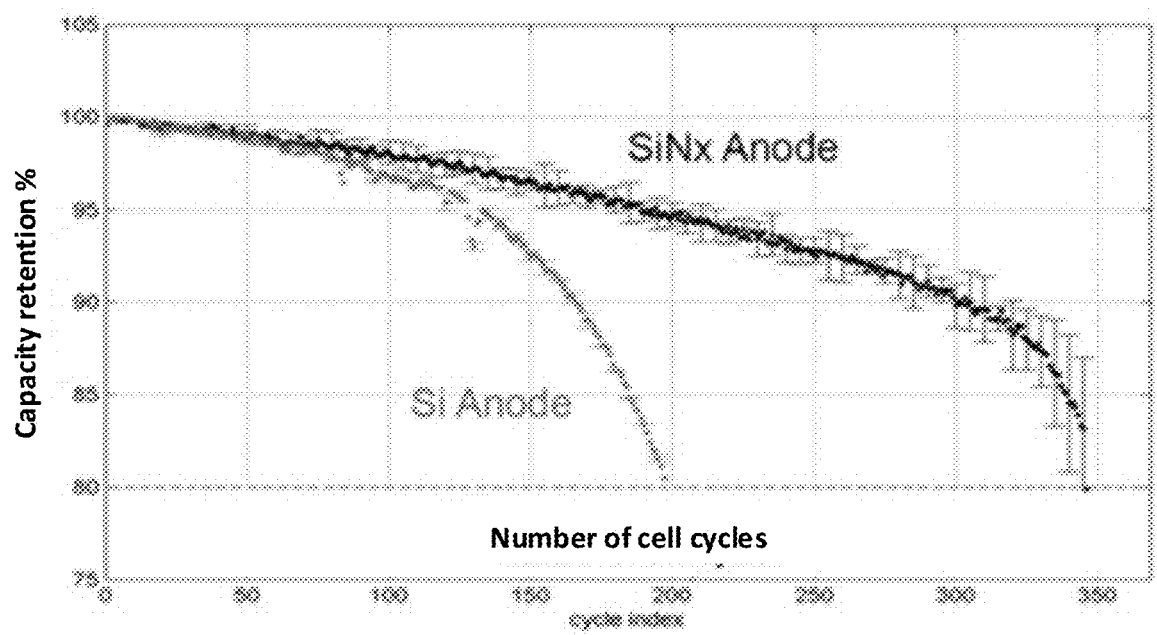
FIG. 8 is a graph that shows capacity retention as a function of cycle index for a silicon anode compared with a $SiE_x$ anode.

FIG. 8 is a graph that shows capacity retention as a function of cell cycle number for both the silicon-rich $SiN_x$ cell and a cell with an anode that contained only silicon. Both cells were charged and discharged at C/2 rate. The $SiN_x$ capacity retention profile for the $SiN_x$ cell degrades much slower than for the Si only cell. The $SiN_x$ cell life cycle is about 75% longer than that of the Si only cell. Cycling data from cells that contain silicon-rich $SiE_x$ anodes, as described herein, shows that such anodes have increased cycle lifetimes compared to anodes made from silicon alone.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself

We claim:
1. An anode for a lithium battery, comprising:
a substrate;
an array of nanowires rooted to the substrate, the nanowires each having a surface;
a first layer coating most or all of the surfaces of the nanowires, the layer comprising a $SiE_x$ material; and
a second layer over the first layer, any exposed surfaces of the nanowires, and the substrate, the second layer comprising either silicon or a $SiF_y$ material;
wherein x greater than zero and less than 1;
wherein y is greater than zero and less than 1; and
wherein E is selected from the group consisting of nitrogen, carbon, boron, phosphorus, magnesium, aluminum, germanium, tin, nickel, copper, and combinations thereof, and F is each selected from the group consisting of nitrogen, carbon, boron, phosphorus, oxygen, magnesium, aluminum, germanium, tin, nickel, copper, and combinations thereof
and F is selected independently from the group consisting of nitrogen, carbon, boron, phosphorus, oxygen, magnesium, aluminum, germanium, tin, nickel, copper, and combinations thereof.
2. The anode of claim 1, wherein x is between 0.01 and 0.5.
3. The anode of claim 1, wherein x between is 0.01 and 0.3.
4. The anode of claim 1, wherein x is between 0.01 and 0.1.
5. The anode of claim 1 wherein a concentration gradient of E in the $SiE_x$ material varies through a thickness direction of the first layer and/or a concentration gradient of F in the $SiF_y$ material varies through a thickness direction of the second layer.
6. The anode of claim 1, wherein the density of the second layer is greater than the density of the first layer.
7. The anode of claim 1, wherein the average density of the first layer is less than 2.1 g/cm³.
8. The anode of claim 1, wherein the average density of the second layer is greater than 2.0 g/cm³.
9. The anode of claim 1, wherein the density of the first layer varies throughout the first layer.
10. The anode of claim 1, wherein the density of the second layer varies throughout the second layer.
11. The anode of claim 1, wherein the first layer is non-conformal to the array of nanowires.
12. The anode of claim 1, wherein the second layer is conformal to the first layer.
13. The anode of claim 1, further comprising a third layer over the second layer, the third layer comprising no silicon.
14. The anode of claim 1, wherein the array of nanowires comprises silicide nanowires.
15. The anode of claim 1, wherein the first layer is between about 5 and 20 microns thick at its maximum diameter.
16. The anode of claim 1, wherein the second layer is between 5 and 500 nanometers thick.
17. The anode of claim 1, wherein the second layer is between 5 and 100 nanometers thick.

18. A lithium battery, comprising:
an anode as in claim 1;
a lithium-containing cathode;
an electrolyte in ionic communication with both the anode and the cathode.

* * * * *